(12) United States Patent
Holmes et al.

(10) Patent No.: US 10,467,721 B2
(45) Date of Patent: Nov. 5, 2019

(54) METHODS OF MANUFACTURING SECURITY DOCUMENTS AND SECURITY DEVICES

(71) Applicant: DE LA RUE INTERNATIONAL LIMITED, Basingstoke, Hampshire (GB)

(72) Inventors: Brian William Holmes, Fleet (GB); Robert Whiteman, Reading (GB); Lawrence George Commander, Tilehurst (GB)

(73) Assignee: DE LA RUE INTERNATIONAL LIMITED, Hampshire (GB)

( * ) Notice: Subject to any disclaimer, the term of this patent is extended or adjusted under 35 U.S.C. 154(b) by 0 days.

(21) Appl. No.: 15/740,596

(22) PCT Filed: Jul. 11, 2016

(86) PCT No.: PCT/GB2016/052086
§ 371 (c)(1),
(2) Date: Dec. 28, 2017

(87) PCT Pub. No.: WO2017/009621
PCT Pub. Date: Jan. 19, 2017

(65) Prior Publication Data
US 2018/0315151 A1 Nov. 1, 2018

(30) Foreign Application Priority Data
Jul. 10, 2015 (GB) .................. 1512118.9

(51) Int. Cl.
*G06T 1/00* (2006.01)
*G06T 7/80* (2017.01)
(Continued)

(52) U.S. Cl.
CPC ...... *G06T 1/0014* (2013.01); *B29D 11/00298* (2013.01); *B29D 11/00365* (2013.01);
(Continued)

(58) Field of Classification Search
CPC ........ B42D 25/00; B42D 25/23; B42D 25/30; B42D 25/342; B42D 25/48; G02B 2/0006;
(Continued)

(56) References Cited

U.S. PATENT DOCUMENTS

| 3,241,429 A | 3/1966 | Rice et al. |
| 4,892,336 A | 1/1990 | Kaule et al. |

(Continued)

FOREIGN PATENT DOCUMENTS

| EP | 2811470 A1 | 12/2014 |
| GB | 2205529 A | 12/1988 |

(Continued)

OTHER PUBLICATIONS

Oct. 24, 2016 International Search Report and Written Opinion issued in International Patent Application No. PCT/GB2016/052086.
(Continued)

*Primary Examiner* — Thai Q Tran
*Assistant Examiner* — Syed Y Hasan
(74) *Attorney, Agent, or Firm* — Oliff PLC

(57) ABSTRACT

Methods of manufacturing security documents and security devices, and corresponding products, provide a lenticular device effect in a first registration zone. Viewing its appearance from two different angles in this way, the relative positioning of the focussing element array and the image array can be judged to a high degree of accuracy. If the two arrays do not have the desired relative position, this will be clearly apparent since the different first and second images (Continued)

will not be captured at the first and second test viewing angles.

13 Claims, 10 Drawing Sheets

(51) Int. Cl.
| | | |
|---|---|---|
| *B29D 11/00* | (2006.01) | |
| *G02B 3/00* | (2006.01) | |
| *G02B 1/04* | (2006.01) | |
| *B42D 25/425* | (2014.01) | |
| *B42D 25/45* | (2014.01) | |
| *B42D 25/455* | (2014.01) | |
| *B42D 25/324* | (2014.01) | |
| *B42D 25/46* | (2014.01) | |
| *B42D 25/342* | (2014.01) | |
| *B42D 25/351* | (2014.01) | |
| *B42D 25/355* | (2014.01) | |
| *B42D 25/378* | (2014.01) | |
| *B42D 25/48* | (2014.01) | |
| *B42D 25/29* | (2014.01) | |
| *B42D 25/23* | (2014.01) | |
| *B42D 25/24* | (2014.01) | |
| *B42D 25/47* | (2014.01) | |
| *B41M 3/14* | (2006.01) | |
| *G06K 9/32* | (2006.01) | |
| *H04N 1/00* | (2006.01) | |
| *H04N 5/232* | (2006.01) | |
| *H04N 5/247* | (2006.01) | |

(52) U.S. Cl.
CPC ......... *B29D 11/00442* (2013.01); *B41M 3/14* (2013.01); *B42D 25/342* (2014.10); *B42D 25/351* (2014.10); *B42D 25/355* (2014.10); *B42D 25/378* (2014.10); *B42D 25/425* (2014.10); *B42D 25/45* (2014.10); *B42D 25/455* (2014.10); *B42D 25/48* (2014.10); *G02B 1/041* (2013.01); *G02B 3/005* (2013.01); *G02B 3/0006* (2013.01); *G02B 3/0012* (2013.01); *G02B 3/0031* (2013.01); *G06K 9/3216* (2013.01); *G06K 9/3275* (2013.01); *G06T 7/80* (2017.01); *H04N 1/00267* (2013.01); *H04N 5/23212* (2013.01); *H04N 5/247* (2013.01); *B42D 25/23* (2014.10); *B42D 25/24* (2014.10); *B42D 25/29* (2014.10); *B42D 25/47* (2014.10); *G06K 2009/3225* (2013.01); *G06T 2207/30144* (2013.01)

(58) Field of Classification Search
CPC . G02B 27/2214; G06K 9/3216; G06K 9/3275
USPC ............... 348/95; 359/2, 15, 619; 427/7
See application file for complete search history.

(56) References Cited

U.S. PATENT DOCUMENTS

| | | | |
|---|---|---|---|
| 5,461,495 A | 10/1995 | Steenblik et al. | |
| 6,856,462 B1 | 2/2005 | Scarbrough et al. | |
| 7,609,451 B1 | 10/2009 | Scarbrough | |
| 8,755,101 B2* | 6/2014 | Lundvall | B29C 59/046 359/9 |
| 8,861,055 B2* | 10/2014 | Holmes | G02B 27/2214 359/15 |
| 2009/0297805 A1 | 12/2009 | Dichtl | |
| 2011/0116152 A1 | 5/2011 | Guigan et al. | |
| 2013/0071568 A1 | 3/2013 | Guigan | |
| 2015/0146297 A1* | 5/2015 | Commander | B42D 25/30 359/627 |

FOREIGN PATENT DOCUMENTS

| | | |
|---|---|---|
| GB | 2490780 A | 11/2012 |
| JP | 2015-075444 A | 4/2015 |
| WO | 94/27254 A1 | 11/1994 |
| WO | 2005/052650 A2 | 6/2005 |
| WO | 2009/085004 A1 | 7/2009 |
| WO | 2010/042999 A1 | 4/2010 |
| WO | 2011/051669 A1 | 5/2011 |
| WO | 2011/051670 A2 | 5/2011 |
| WO | 2011/102800 A1 | 8/2011 |
| WO | 2011/107782 A1 | 9/2011 |
| WO | 2011/107783 A1 | 9/2011 |
| WO | 2012/027779 A1 | 3/2012 |
| WO | 2014/070079 A1 | 5/2014 |
| WO | 2015/011493 A1 | 1/2015 |
| WO | 2015/011494 A1 | 1/2015 |
| WO | 2015/044671 A1 | 4/2015 |

OTHER PUBLICATIONS

Jan. 11, 2017 Combined Search and Examination Report issued in British Patent Application No. GB1612023.0.
Jul. 4, 2016 Search Report issued in British Application No. GB1609050.8.
Jan. 16, 2018 International Preliminary Report on Patentability issued in International Patent Application No. PCT/GB2016/052086.

* cited by examiner

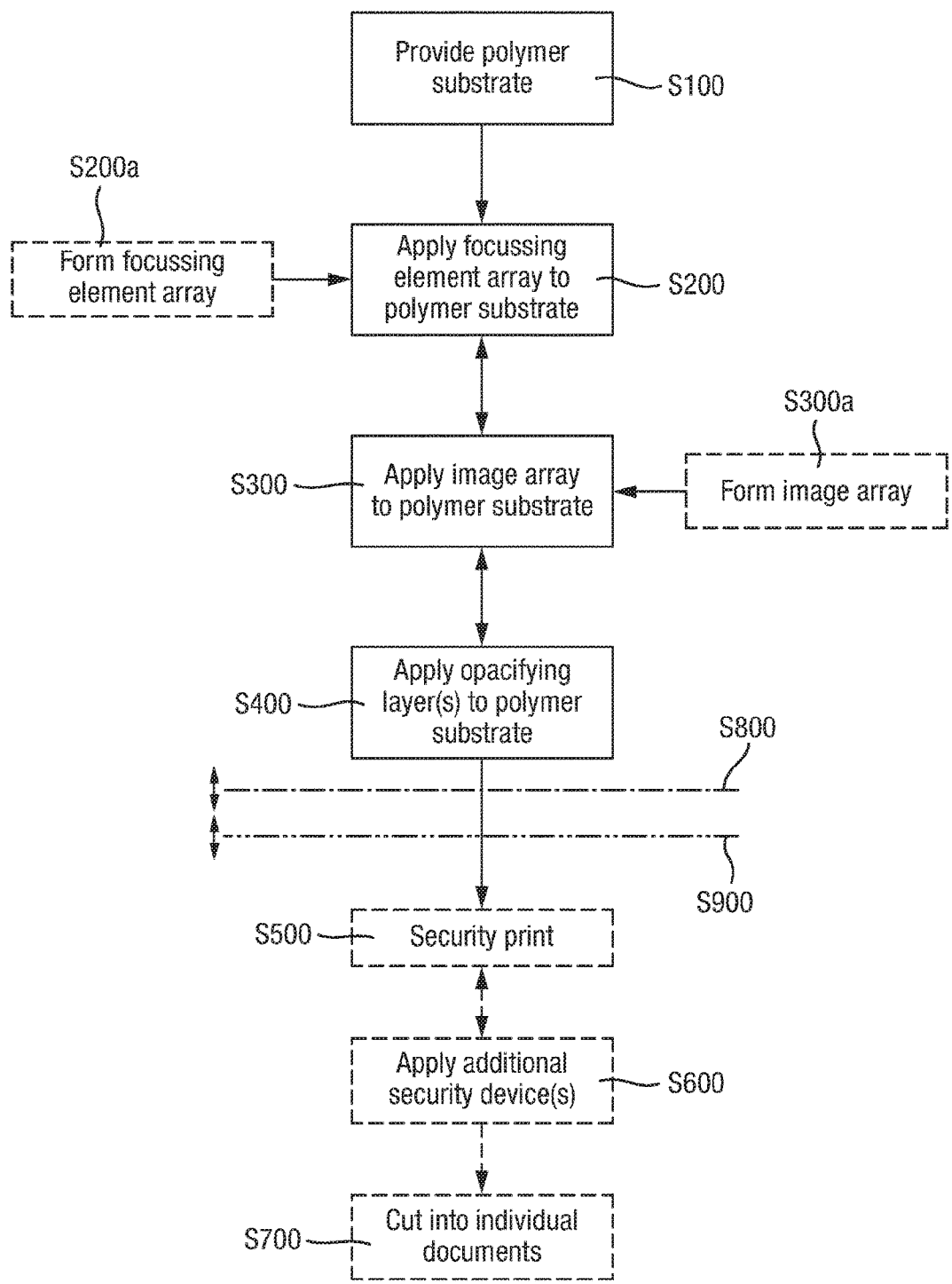

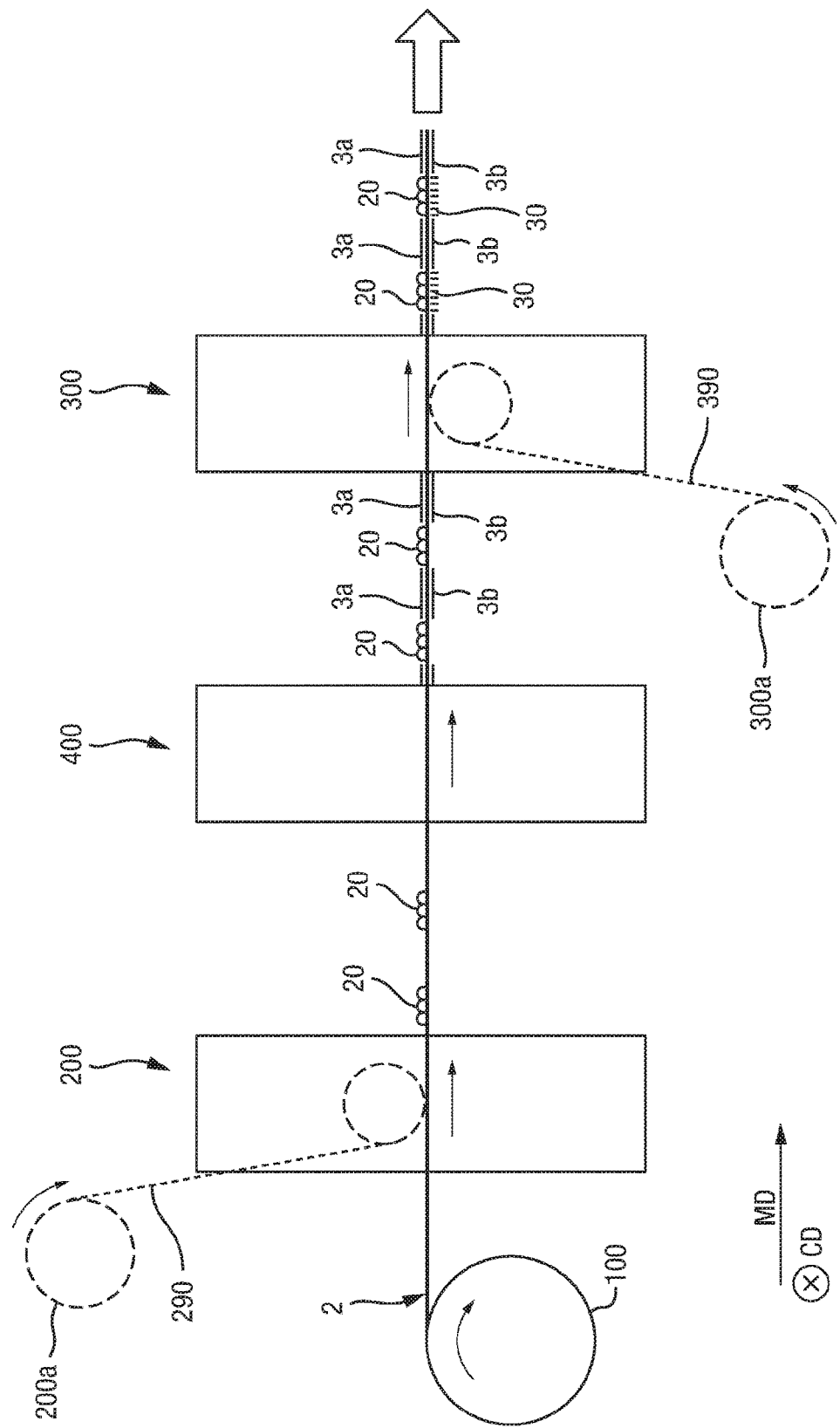

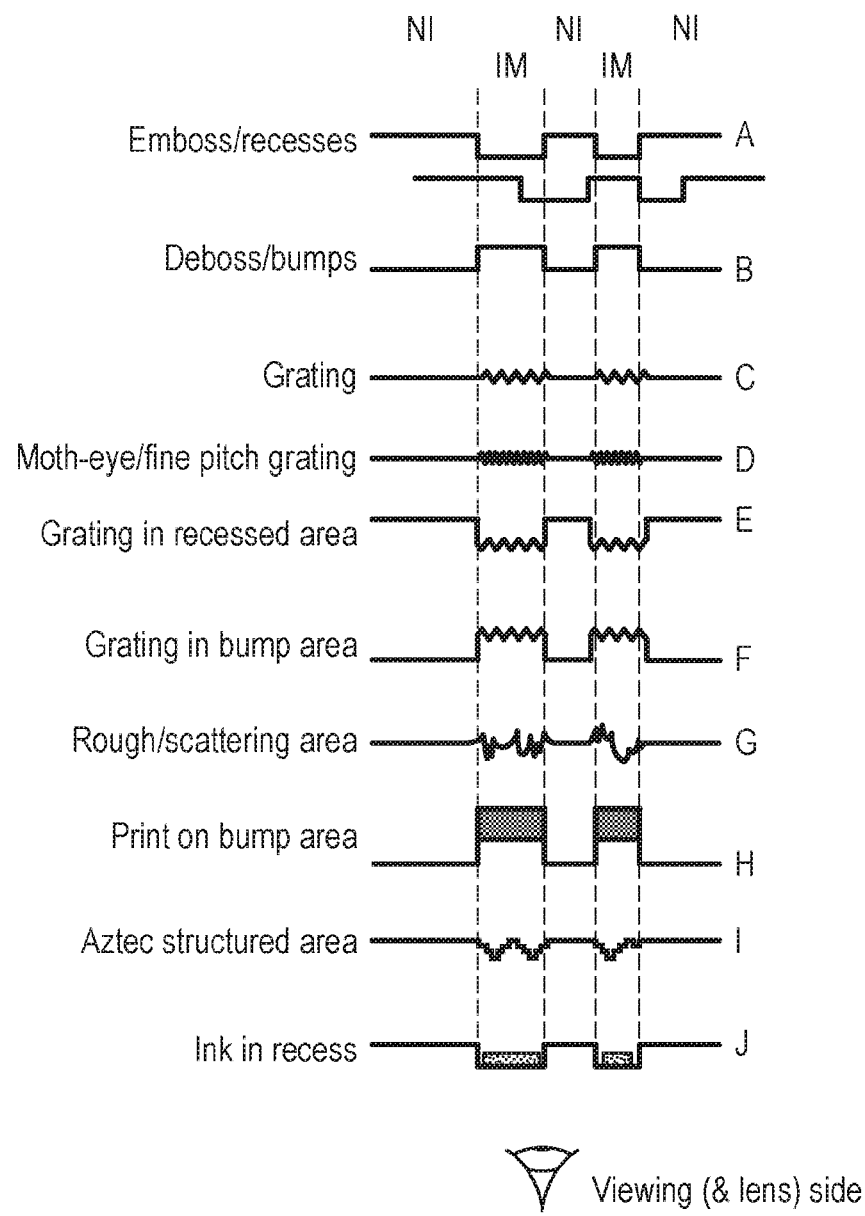

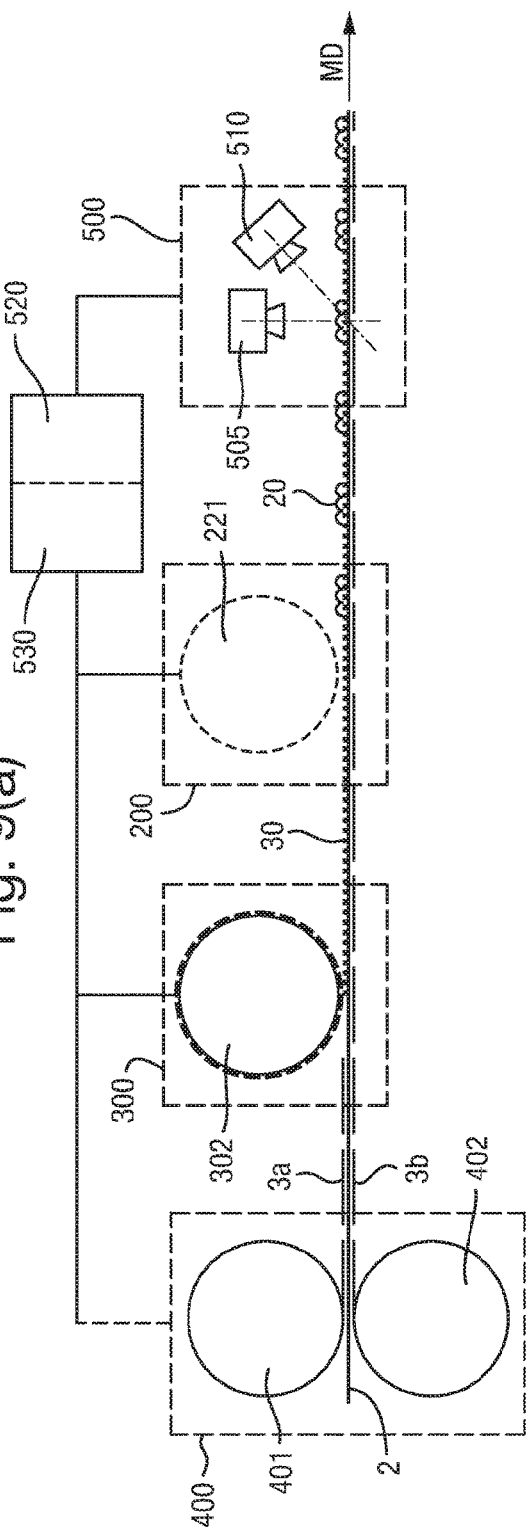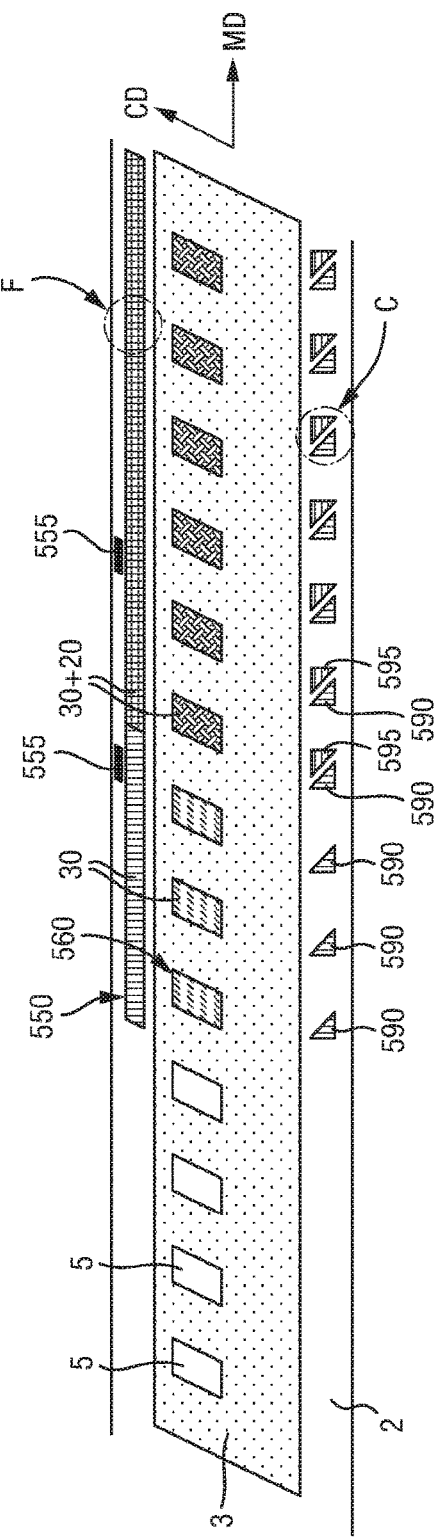

METHODS OF MANUFACTURING SECURITY DOCUMENTS AND SECURITY DEVICES

This invention relates to methods of manufacturing security documents and security devices, and to the corresponding products. Security devices are typically used on security documents such as banknotes, cheques, passports, identity cards, certificates of authenticity, fiscal stamps and other secure documents, in order to confirm their authenticity.

Articles of value, and particularly documents of value such as banknotes, cheques, passports, identification documents, certificates and licences, are frequently the target of counterfeiters and persons wishing to make fraudulent copies thereof and/or changes to any data contained therein. Typically such objects are provided with a number of visible security devices for checking the authenticity of the object. By "security device" we mean a feature which it is not possible to reproduce accurately by taking a visible light copy, e.g. through the use of standardly available photocopying or scanning equipment. Examples include features based on one or more patterns such as microtext, fine line patterns, latent images, venetian blind devices, lenticular devices, moiré interference devices and moiré magnification devices, each of which generates a secure visual effect. Other known security devices include holograms, watermarks, embossings, perforations and the use of colour-shifting or luminescent/fluorescent inks. Common to all such devices is that the visual effect exhibited by the device is extremely difficult, or impossible, to copy using available reproduction techniques such as photocopying. Security devices exhibiting non-visible effects such as magnetic materials may also be employed.

One class of security devices are those which produce an optically variable effect, meaning that the appearance of the device is different at different angles of view. Such devices are particularly effective since direct copies (e.g. photocopies) will not produce the optically variable effect and hence can be readily distinguished from genuine devices. Optically variable effects can be generated based on various different mechanisms, including holograms and other diffractive devices, moiré interference and other mechanisms relying on parallax such as venetian blind devices, and also devices which make use of focussing elements such as lenses, including moiré magnifier devices, integral imaging devices and so-called lenticular devices.

Security devices comprising focussing elements typically require the use of at least one transparent material either to act as an optical spacer between the focussing elements and an image, or image array, on which the focussing elements are to focus, or to act as a support for the focussing element so that some other object can be viewed therethrough. As such, security devices comprising focussing elements are particularly well suited to deployment on security documents based on polymer document substrates, such as polymer banknotes, since the polymer document substrate can be selected to be transparent and so provide one or both of the above functions if desired. Therefore, in the main part the present disclosure relates to polymer-based security documents.

However, other aspects of the invention disclosed herein are not so limited as will be made clear below. For example, the security devices can be formed using a transparent material which is applied to a security document of any sort, such as a conventional paper-based document, e.g. in the form of a security article such as a thread, strip, patch, foil or inserted which is incorporated into or applied onto the security document.

Several aspects of the invention involve the provision of a focussing element array and an image array located approximately in the focal plane of the focussing element array such that the focussing element array exhibits a substantially focussed image of the image array. This focussed image may preferably be optically variable and could for example be based on any of the mechanisms detailed below. It should be appreciated that in all aspects of the invention the focussing element array and image array could optionally be configured to provide any one or more of these effects, unless otherwise specified:

Moiré magnifier devices (examples of which are described in EP-A-1695121, WO-A-94/27254, WO-A-2011/107782 and WO2011/107783) make use of an array of focusing elements (such as lenses or mirrors) and a corresponding array of microimages, wherein the pitches of the focusing elements and the array of microimages and/or their relative locations are mismatched with the array of focusing elements such that a magnified version of the microimages is generated due to the moiré effect. Each microimage is a complete, miniature version of the image which is ultimately observed, and the array of focusing elements acts to select and magnify a small portion of each underlying microimage, which portions are combined by the human eye such that the whole, magnified image is visualised. This mechanism is sometimes referred to as "synthetic magnification". The magnified array appears to move relative to the device upon tilting and can be configured to appear above or below the surface of the device itself. The degree of magnification depends, inter alia, on the degree of pitch mismatch and/or angular mismatch between the focusing element array and the microimage array.

Integral imaging devices are similar to moiré magnifier devices in that an array of microimages is provided under a corresponding array of lenses, each microimage being a miniature version of the image to be displayed. However here there is no mismatch between the lenses and the microimages. Instead a visual effect is created by arranging for each microimage to be a view of the same object but from a different viewpoint. When the device is tilted, different ones of the images are magnified by the lenses such that the impression of a three-dimensional image is given.

"Hybrid" devices also exist which combine features of moiré magnification devices with those of integral imaging devices. In a "pure" moiré magnification device, the microimages forming the array will generally be identical to one another. Likewise in a "pure" integral imaging device there will be no mismatch between the arrays, as described above. A "hybrid" moiré magnification/integral imaging device utilises an array of microimages which differ slightly from one another, showing different views of an object, as in an integral imaging device. However, as in a moiré magnification device there is a mismatch between the focusing element array and the microimage array, resulting in a synthetically magnified version of the microimage array, due to the moiré effect, the magnified microimages having a three-dimensional appearance. Since the visual effect is a result of the moiré effect, such hybrid devices are considered a subset of moiré magnification devices for the purposes of the present disclosure. In general, therefore, the microimages provided in a moiré magnification device should be substantially identical in the sense that they are either exactly the same as one another (pure moiré magnifiers) or show the same object/scene but from different viewpoints (hybrid devices).

Moiré magnifiers, integral imaging devices and hybrid devices can all be configured to operate in just one dimension (e.g. utilising cylindrical lenses) or in two dimensions (e.g. comprising a 2D array of spherical or aspherical lenses).

Lenticular devices on the other hand do not rely upon magnification, synthetic or otherwise. An array of focusing elements, typically cylindrical lenses, overlies a corresponding array of image sections, or "slices", each of which depicts only a portion of an image which is to be displayed. Image slices from two or more different images are interleaved and, when viewed through the focusing elements, at each viewing angle, only selected image slices will be directed towards the viewer. In this way, different composite images can be viewed at different angles. However it should be appreciated that no magnification typically takes place and the resulting image which is observed will be of substantially the same size as that to which the underlying image slices are formed. Some examples of lenticular devices are described in U.S. Pat. No. 4,892,336, WO-A-2011/051669, WO-A-2011051670, WO-A-2012/027779 and U.S. Pat. No. 6,856,462. More recently, two-dimensional lenticular devices have also been developed and examples of these are disclosed in British patent application numbers 1313362.4 and 1313363.2. Lenticular devices have the advantage that different images can be displayed at different viewing angles, giving rise to the possibility of animation and other striking visual effects which are not possible using the moiré magnifier or integral imaging techniques.

Arrays of lenses or other focussing elements can also be used as a security device on their own (i.e. without a corresponding image array), since they can be used to exhibit a magnified or distorted view of any background they may be placed against, or scene viewed therethrough. This effect cannot be replicated by photocopying or similar.

Aspects of the present invention provide improved methods of manufacturing security documents comprising security devices of the sorts described above.

The present invention provides a method of manufacturing a security device, comprising:
  providing a transparent support layer having first and second surfaces, in the form of a web;
  conveying the web along a transport path in a machine direction; and during the conveying, in either order or simultaneously:
    (a) forming an array of focussing elements on the first surface of the transparent support layer in at least a first region; and
    (b) applying an image array to the second surface of the transparent support layer in at least part of the first region;
  wherein at least in a first registration zone of the transparent support layer:
    the image array comprises a set of first image elements comprising portions of a first image, interleaved with a set of second image elements comprising portions of a second image, and the focussing element array is configured such that each focussing element can direct light from a respective one of the first image elements or from a respective one of the second image elements therebetween in dependence on the viewing angle, whereby depending on the viewing angle the array of focussing elements directs light from either the set of first image elements or from the second image elements therebetween, such that as the device is tilted, the first image is displayed to the viewer at a first range of viewing angles and the second image is displayed to the viewer at a second, different range of viewing angles; then:
    (x) optically capturing the images displayed by the security device from each of at least a first and a second test viewing angle, the first and second test viewing angles being different from one another, the first test viewing angle lying in an expected first range of viewing angles and the second test viewing angle lying in an expected second range of viewing angles;
    (y) comparing the captured images against one another and/or against stored information corresponding to the first and second images respectively and making a determination as to whether the first and second images are displayed over the expected first and second ranges of viewing angles; and
    (z) based on the determination, providing feedback control to thereby adjust one or more parameters of step (a) and/or step (b) when performed on subsequent parts of the transparent support layer;
  whereby on the subsequent parts of the transparent support layer the array of focussing elements and the image array are more accurately registered to one another in at least one direction.

By providing a lenticular device effect in the first registration zone and viewing its appearance from two different angles in this way, the relative positioning of the focussing element array and the image array can be judged to a high degree of accuracy. If the two arrays do not have the desired relative position, this will be clearly apparent since the different first and second images will not be captured at the first and second test viewing angles. For instance, the same (first or second) image may be captured at both test viewing angles, or some intermediate (mixed) view may be captured at one or both, or if more than two images are interleaved in the device, some different third image may be captured at one of the angles. This can be identified either by comparing the captured images against one another or against stored information relating to the expected images (e.g. digital copies of those images).

If the expected images are captured at each test angle, then the focussing elements and image array are deemed to be at the correct relative locations and hence no adjustment to the processes of steps (a) or (b) is required. However, if not, the system executes feedback control of step (a) and/or (b), adjusting the parameters so as to adjust the relative position of the focussing elements and image array on subsequent portions of the web. The so-adjusted portion is then optically captured in the same way and feedback continues until the desired position is achieved.

The first and second images could be of any nature but in preferred examples, each will be a uniform block of colour, preferably with a high level of contrast between the two. For instance, the first image could be solid area of black or another dark colour across the registration zone, and the second image could be white or another light colour (e.g. blank). In this case step (y) could comprise comparing the brightness levels of the two images against one another and the two images will be deemed correct if the difference between the two brightness levels is over a certain threshold. Alternatively the two images could comprise different shapes, e.g. a line in the machine direction and a line in the cross direction, in which case step (y) could involve the use of pattern recognition software to determine whether each image is as expected.

It should be noted that whilst in the first registration zone, the focussing elements and image array is specifically configured to provide a lenticular effect as defined above, this does not limit the nature of the focussing element array. Elsewhere, the focussing element array and the image array could take any form but since they are each formed in the same step as those parts in the registration zone, if the lenticular device in the first registration zone is correctly aligned using the above-described method, the two arrays will also be correctly aligned across the rest of the support layer. Hence whilst the first registration zone itself could be the security device, in other cases another area of the support, the device zone, may contain another configuration of the focussing element array and image array as necessary to exhibit the optical effect desired in the finished security device.

Registration between the focussing elements and image array is not required in all devices. For example, moiré magnification devices do not require registration unless a particular location of the magnified image is required relative to the reference frame of the device, from a particularly viewing angle. However, in lenticular devices it is highly desirable to achieve accurate registration between the focussing elements and the image array in order to control which image is visible at which viewing angle, and hence the order in which the images will be displayed as the device is tilted. Hence the present method is particularly advantageous in cases where the security device being manufactured is a lenticular device.

Advantageously in step (z) any one or more of the following parameters of step (a) and/or step (b) are controlled based on the determination:
  the relative position of the apparatus for performing steps (a) and (b) in the machine direction and/or in the cross direction orthogonal to the machine direction;
  the speed at which the transparent support layer is conveyed during step (a) and/or step (b);
  the temperature at which step (a) is performed; and
  the tension at which the transparent support layer is held during step (a) and/or step (b).

Changing the relative position of the apparatus can be used to translate the focussing element array and image array relative to one another in the machine direction and/or the cross direction. A piezoelectric stepping system may be provided to move the apparatus in the cross direction to achieve the small adjustments necessary. Changing the relative speed can also be used to translate the focussing element array and image array relative to one another in the machine direction. Changing the temperature at which the focussing elements are formed affects the degree of curing and/or shrinking of the formed array, resulting in a change in pitch of the focussing element array. Likewise the pitch of both the focussing element array and of the image array can be adjusted through changing the web tension. More information about how to change parameters of such processes in order to achieve the necessary adjustments can be found in WO2009085004.

In a particularly preferred embodiment, in step (a), a focussing element cylinder carrying a surface relief on its circumference corresponding to the array of focussing elements is used to form the array of focussing elements on the first surface of the transparent support layer, and in step (b), an image cylinder is used to apply the image array to the second surface of the transparent support layer, wherein optionally steps (a) and (b) are performed simultaneously at a nip formed between the focussing element cylinder and the image cylinder, the transparent support layer passing through the nip.

Preferably, in step (z) any one or more of the following parameters of step (a) and/or step (b) are controlled based on the determination:
  the relative position of the focussing element cylinder and the image cylinder in the machine direction and/or in the cross direction orthogonal to the machine direction;
  the speed of rotation of the focussing element cylinder and/or the image cylinder;
  the temperature of the focussing element cylinder; or
  the tension at which the transparent support layer is held during step (a) and/or step (b).

Advantageously, step (x) is performed using an optical capture module comprising at least first and second optical detectors (e.g. cameras) configured to view the same area of the transparent support layer at the first and second test viewing angles respectively.

In some preferred implementations, step (x) is performed using an optical capture module comprising a first optical detector and apparatus configured to change the relative position of the first optical detector and an area of the transparent support layer, the first optical detector being used to view the same area of the transparent support layer at the first and second test viewing angles sequentially.

Preferably, step (y) is performed by an image comparison module executed by a processor.

Advantageously, step (z) is performed by a controller.

Preferably, in a device zone of the transparent support layer, the array of focussing elements and/or the image array has a different configuration from that in the first registration zone.

The above-described technique provides improved lateral registration—i.e. control of the relative translational positions of the image array and the focussing element array. However in some implementations it may also be desirable to use feedback to control the relative pitch and/or orientation (skew) of the two components. This can be achieved by providing a second registration zone containing a moiré interference device. Hence, in preferred embodiments, in a second registration zone of the transparent support layer, laterally offset from the first registration zone:
  the image array comprises a regular array of markings, and the focussing element array comprises a corresponding regular array of focussing elements, whereby a mismatch in pitch and/or orientation between the regular array of markings and the regular array of focussing elements gives rise to a moiré interference pattern;
  and the method further comprises:
  (u) optically capturing the appearance of the second registration zone;
  (v) determining whether a moiré interference pattern exists in the captured image; and
  (w) based on the determination in step (v), providing feedback control to thereby adjust one or more parameters of step (a) and/or step (b) when performed on subsequent parts of the transparent support layer;
  whereby on the subsequent parts of the transparent support layer the array of focussing elements and the relative pitch and/or orientation of the image array and the focussing element array are controlled towards desired values.

Any of the same processing parameters already mentioned above may be controlled in step (w) to achieve the desired control of pitch and/or orientation. It should be noted that whilst typically the second registration zone will be designed such that no moiré interference pattern will be exhibited when the pitch and/or orientation of the two components are at the desired values (since this may be most readily identified by pattern recognition software, for instance) this is not essential. For instance the system could be configured to recognise a particular moiré interference pattern (e.g. a particular band spacing/orientation) as representing the desired structure.

Preferably steps (u) to (w) may be performed before steps (x) to (z) although this is not essential.

This aspect of the invention further provides an apparatus for manufacturing a security device, comprising:
- a transport module adapted to convey a transparent support layer having first and second surfaces, in the form of a web, along a transport path in a machine direction; and, along the transport path in either order or at the same location:
  - (a) focussing element apparatus adapted to form an array of focussing elements on the first surface of the transparent support layer in at least a first region; and
  - (b) image array apparatus adapted to apply an image array to the second surface of the transparent support layer in at least part of the first region;

and, downstream of (a) and (b):
- (x) an optical capture module adapted to optically capture images displayed by the security device from each of at least a first and a second test viewing angle, the first and second test viewing angles being different from one another, the first test viewing angle lying in an expected first range of viewing angles and the second test viewing angle lying in an expected second range of viewing angles;
- (y) a processor configured to compare the captured images against one another and/or against stored information corresponding to first and second images respectively and making a determination as to whether the first and second images are displayed over the expected first and second ranges of viewing angles; and
- (z) based on the determination, providing feedback control to thereby adjust one or more parameters of the focussing element apparatus and/or the image array apparatus for processing of subsequent parts of the transparent support layer;

whereby on the subsequent parts of the transparent support layer the array of focussing elements and the image array are more accurately registered to one another in at least one direction.

Examples of security documents, security devices and methods of manufacture thereof will now be described with reference to the accompanying drawings, in which:

FIG. 2 is a flow diagram illustrating selected steps of a method of manufacturing a security document according to one embodiment;

Figure 4A:
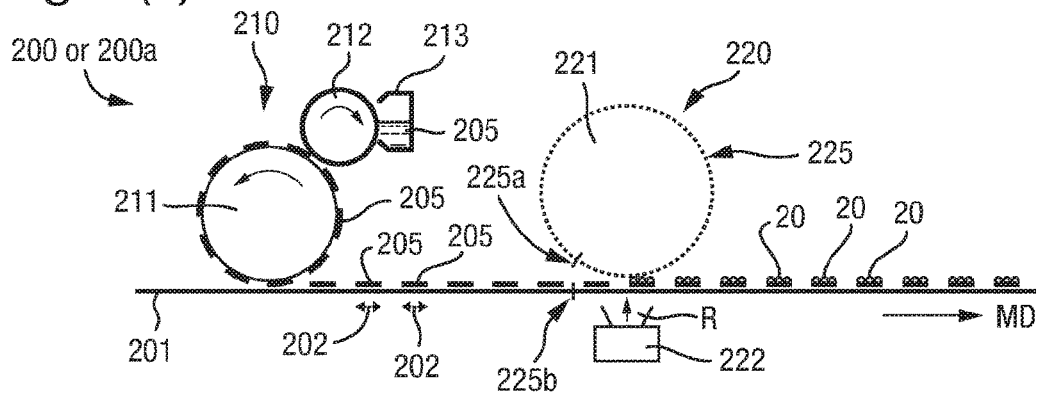
Figure 4B:
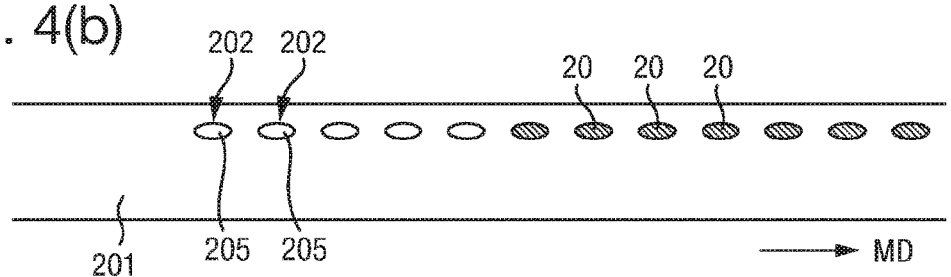
Figure 5A:
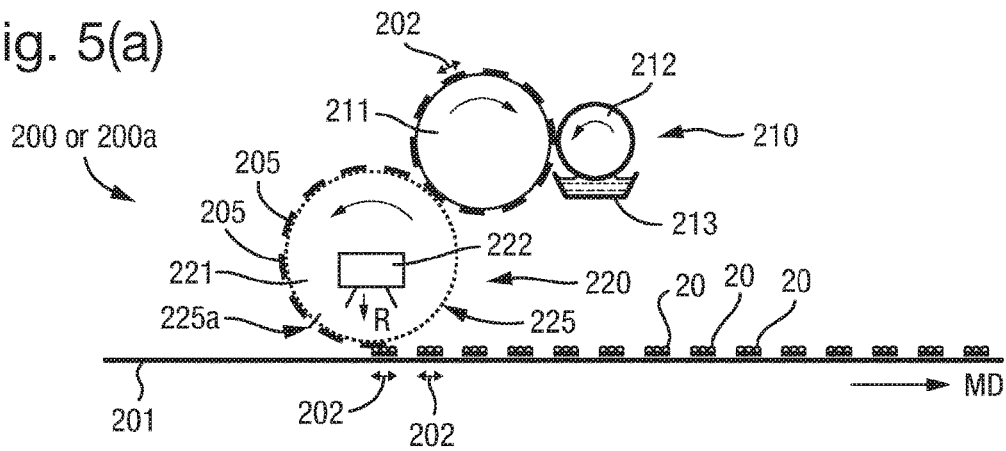
Figure 5B:
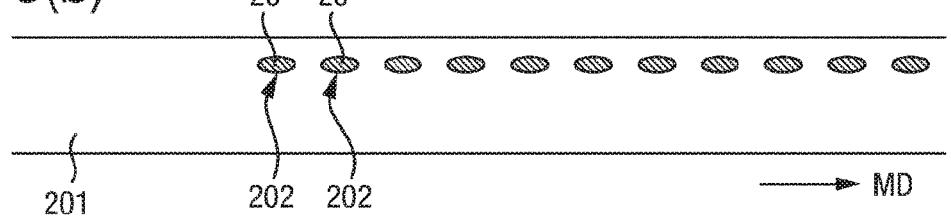
Figure 5C:
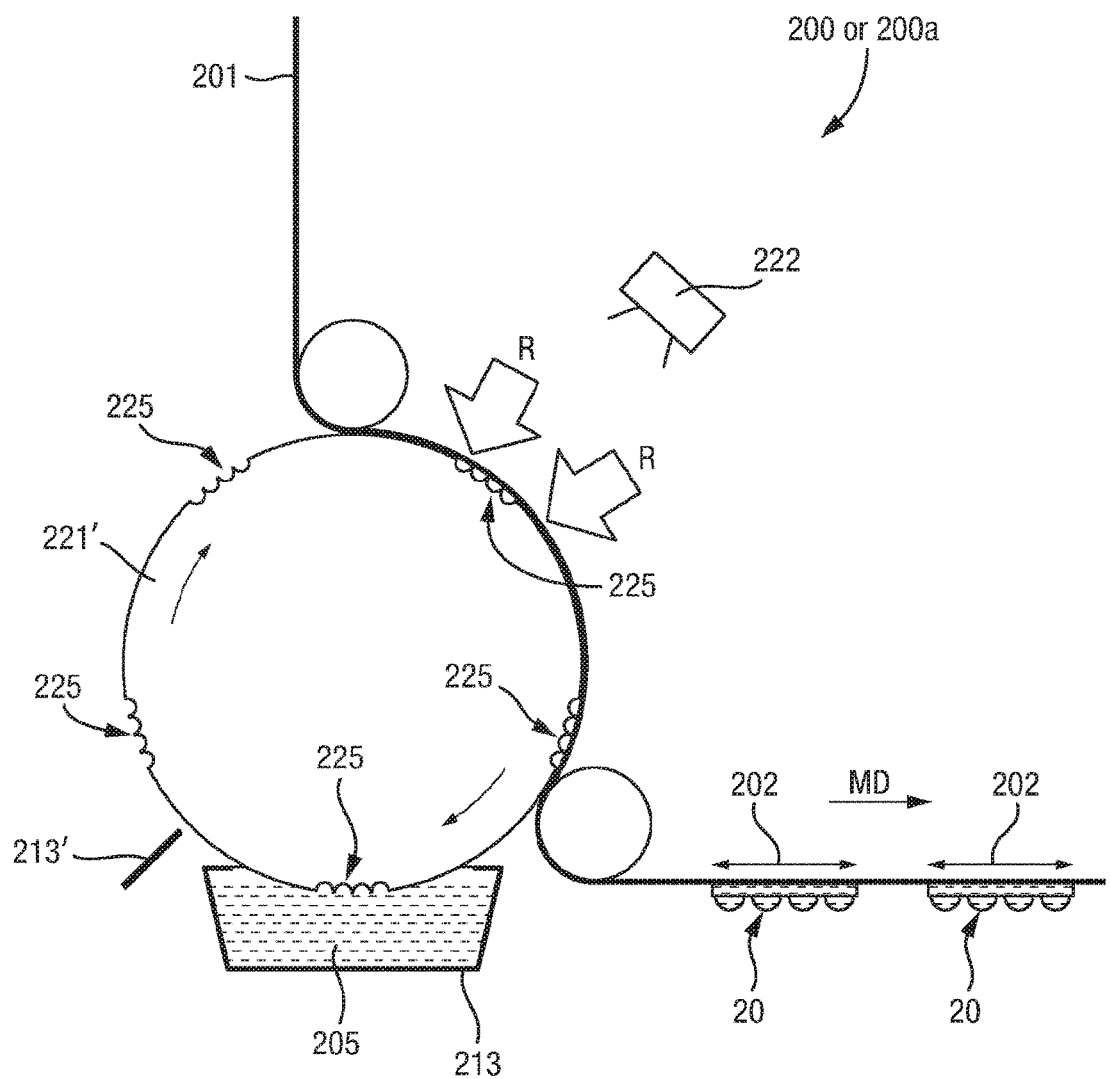
Figure 10A:
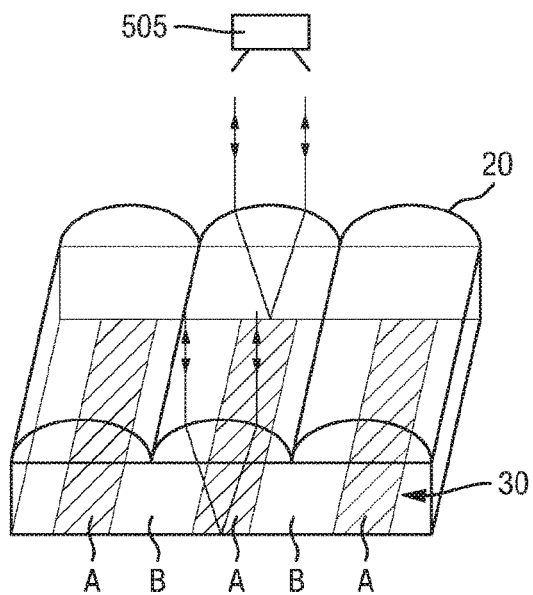
Figure 10B:
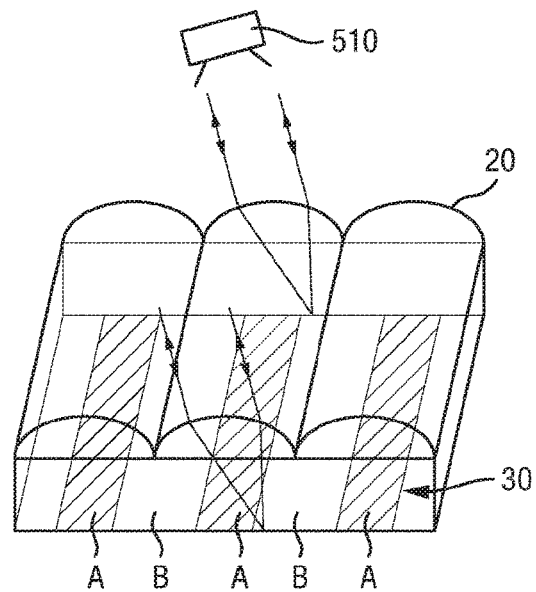
Figure 11A:
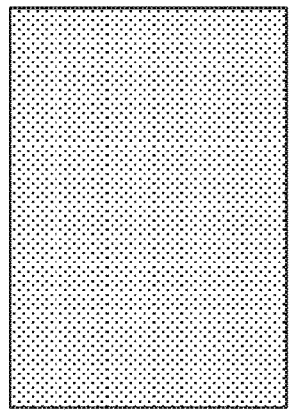
Figure 12:
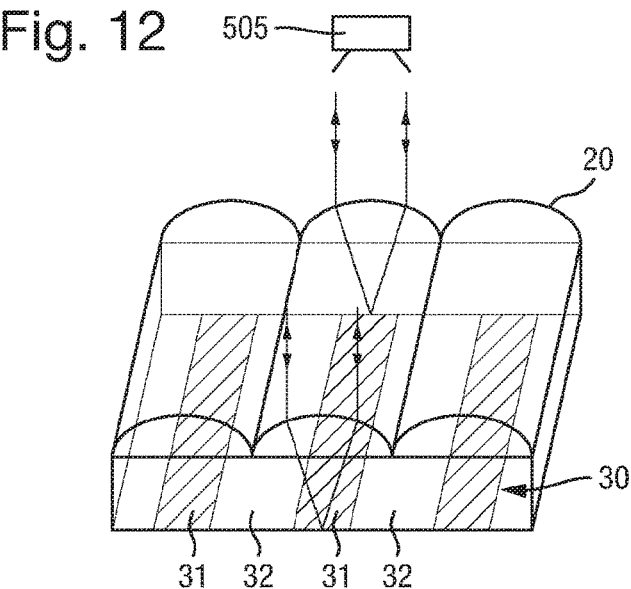
Figure 13A:
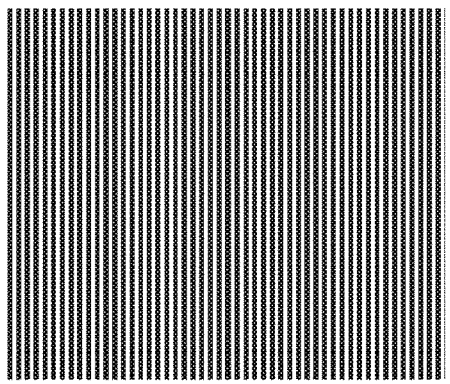
Figure 13B:
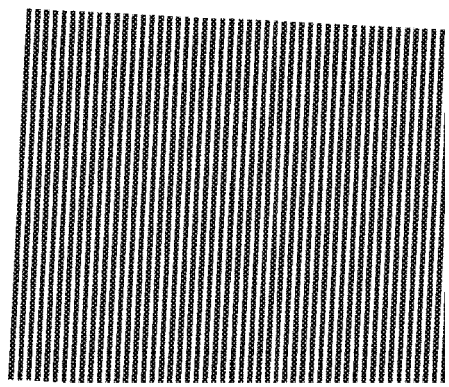
Figure 13C:
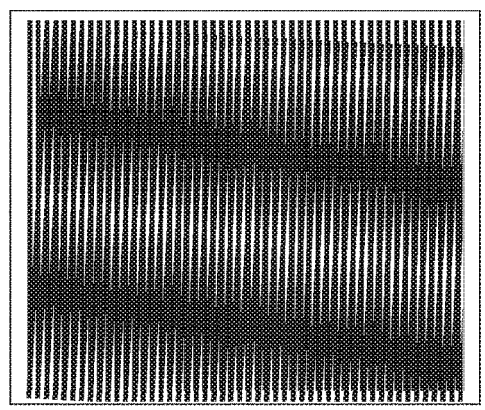

FIG. 3 schematically depicts exemplary apparatus for manufacturing a security document in an embodiment;

FIGS. 4, 5, 6 and 7 show embodiments of apparatus for forming a focussing element array, in each case illustrating (a) the apparatus from a side view, and (b) a perspective view of the focussing element support layer, FIG. 5(c) showing a further variant of FIG. 5(a);

FIG. 8A to J shows examples of elements of image arrays formed as relief structures;

FIG. 9 shows another embodiment of apparatus for forming a security document, in each case illustrating (a) the apparatus from a side view, and (b) a perspective view of the substrate web;

FIGS. 10(a) and (b) schematically illustrate a portion of an exemplary device as may be provided in the first registration zone of FIG. 9, from two different viewing angles;

FIGS. 11(a) and (b) respectively show exemplary first and second images as may be displayed by the device of FIG. 10 at two different viewing angles;

FIG. 12 schematically illustrates a portion of an exemplary device as may be provided in the optional second registration zone of FIG. 9; and FIGS. 13(a) and (b) schematically depict, respectively, an exemplary focussing element array and an exemplary image array as may be provided in the second registration zone; FIG. 13(c) illustrating a moiré interference pattern generated by the two in combination.

The ensuing description will focus on preferred techniques for the manufacture of security documents, such as bank notes, based on polymer document substrates. However, many aspects of the disclosure are more widely applicable and so should not be considered limited to use on polymer-based security documents unless otherwise indicated or necessitated by the nature of the product or method in question. For example, many of the methods and products described below can be utilised on security documents of conventional construction, e.g. paper-based documents. For instance, the described methods can be performed on a polymeric support layer which can then be affixed to or incorporated into a security document of any type. However, in all cases the preference is for combination with a polymer-based security document.

To aid understanding, the following terminology has been used throughout the present disclosure:

Polymer substrate—this refers to a polymer document substrate which ultimately forms the main body of a security document. Examples of such polymer substrates are discussed below.

Focussing element array—this refers to an array of elements capable of focussing visible light, such as lenses or mirrors. The term "array of focussing elements" is analogous. Examples are given below.

Image array—this refers to a graphic which typically comprises a pattern of microimages or image elements, although neither is essential. In preferred cases the image array co-operates with a focussing element array to generate an optically variable effect. For example, the image array and the focussing element array may in combination form a moiré magnifier, an integral imaging device or a lenticular device (each described above), or some other optically variable device. In many preferred examples, the image array is formed of elements of applied ink or another such material. However this is not essential since the image array could instead be formed of recesses or the like. Preferred methods of manufacturing image arrays are discussed below.

Focussing element support layer—this is a layer on the surface of which the focussing elements are formed. The focussing element support layer could be the polymer substrate (defined above) or could be another layer which is then applied to a document substrate (paper or polymer), or used as a carrier from which the focussing elements are later transferred to a document substrate (paper or polymer). For instance the focussing element support layer could take the form of a security article such as a thread, strip, patch or foil which is then incorporated into or onto a security document.

Pattern support layer—this is a layer on the surface of which the image array (e.g. a pattern) is formed. The pattern support layer could be the polymer substrate (defined above) or could be another layer which is then applied to a document substrate (paper or polymer), or used as a carrier from which the image array is later transferred to a document substrate (paper or polymer). For instance the pattern support layer could take the form of a security article such as a thread, strip, patch or foil which is then incorporated into or onto a security document.

Transparent material—"transparent" is used to mean that the material is substantially visually clear, such that an item on one side of the material can be seen sharply through the material from the other side. Therefore transparent materials should have low optical scatter. However, transparent materials may nonetheless be optically detectable (defined below), e.g. carrying a coloured tint.

Optically detectable material/optical detection characteristics—an optically detectable material may or may not be transparent but is detectable either to the human eye or to a machine via an optical detector (e.g. a camera), or both. Thus, the optical detection characteristic(s) of the material could be for example a visible colour, a non-visible reflection or absorbance such as UV or IR reflection or absorbance, or a photoluminescent response such as fluorescence or phosphorescence (the stimulating radiation and/or the emitted radiation being visible or invisible), or the like.

Curable material—"curable" means that the material hardens (i.e. becomes more viscous and preferably solid) in response to exposure to curing energy which may for example comprise heat, radiation (e.g. UV) or an electron beam. The hardening involves a chemical reaction such as cross-linking rather than mere physical solidification, e.g. as is experienced by most materials upon cooling.

For reference throughout the description of preferred manufacturing processes below, FIG. 1 shows an exemplary security document 1, such as a banknote, based on a polymer substrate construction. FIG. 1(a) shows the document in plan view and FIGS. 1(b), (c) and (d) show three alternative cross-sections along the line X-X'. It will be appreciated that the constructions shown are merely exemplary and alternative arrangements are viable, some of which will be discussed with reference to particular preferred manufacturing techniques discussed below.

The security document 1 is based on a polymer substrate 2 which is preferably transparent but this is not essential in all embodiments. The polymer substrate 2 has a first surface 2a and a second surface 2b. It should be noted that wherever components are described herein as being "on" one of the surfaces of the polymer substrate 2, or actions are described as being performed "on" one of said surfaces, this does not require the component or action to be directly on the surface of the polymer substrate. Rather, some intermediate layer, such as a primer layer, could exist immediately on the surface of the polymer substrate itself and the component or action may be applied to or performed on that intermediate layer, unless otherwise specified.

Figure 1A:
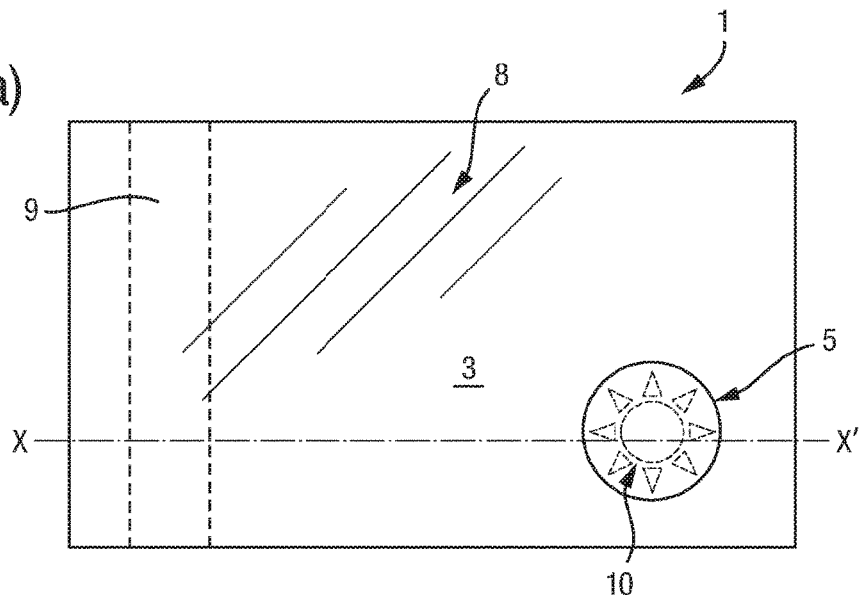
FIG. 1(a) shows an exemplary security document in plan view, FIGS. 1(b), (c) and (d) showing three alternative cross-sections along the line X-X'.

On at least one of the surfaces of the polymer substrate 2, preferably both, one or more opacifying layers 3a, 3b (indicated generally as 3 in FIG. 1(a)) are provided. The opacifying layers typically cover a large proportion of the surface area of the security document 1, in some cases the entire area (as in FIG. 1(c), described below), but in other cases being omitted on one or both sides of the polymer substrate 2 in localised areas to form window regions. An exemplary window region 5 is shown in FIGS. 1(a), (b) and (c) but is omitted in the FIG. 1(d) variant. The opacifying layer(s) 3 are configured to provide a suitable background for a graphics layer 8, typically applied by printing, which in the case of a banknote generally comprises secure fine line patterns such as guilloches, a portrait, currency and denomination information and the like. Thus the opacifying layers 3 are non-transparent and, in the case of a transparent polymer substrate 2, act to increase the opacity of the document 1 as a whole.

Figure 1B:
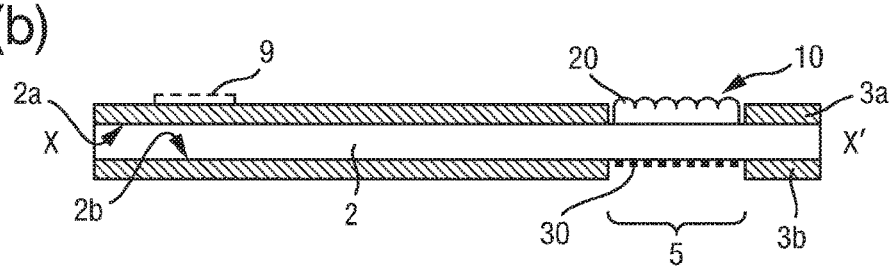
Figure 1C:
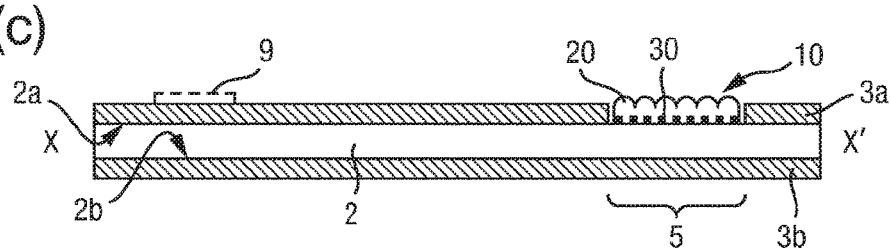
Figure 1D:
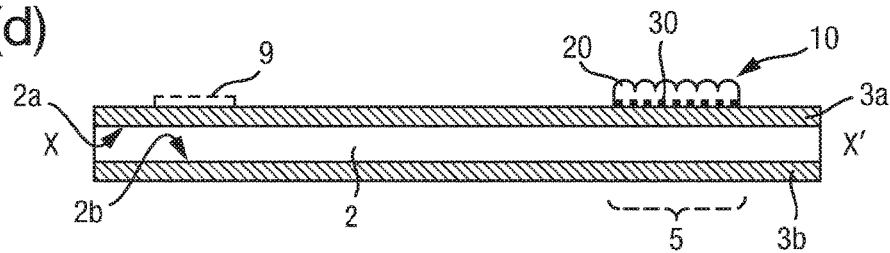

If the opacifying layers 3 are omitted in the window region 5 on both sides of the polymer substrate 2, as shown in FIG. 1(b), the window region will be a "full window" and, provided the polymer substrate is transparent, will itself be transparent. If the opacifying layers are omitted in the window region 5 on one side of the polymer substrate 2 but not the other, the window region will be a "half window" which is non-transparent but typically of lower opacity than the surrounding regions of the document 1. An example of a half window is shown in FIG. 1(c) in which the first opacifying layer(s) 3a on the first surface 2a of the polymer substrate 2 are absent in the window region 5 but the second opacifying layer(s) 3 b on the second surface 2b are continuous across the window region 5. It will be appreciated that the window region 5 could contain a mixture of full and half window areas by arranging the gaps in the first and second opacifying layers to overlap one another only partially (not shown). In FIG. 1(d) there is no window, both opacifying layers 3a and 3b being continuous across region 5.

The security document 1 is provided with a security device 10 which comprises at least an array of focussing elements 20 provided on the first surface of the polymer substrate 2. The security device 10 could consist exclusively of the focussing element array 20 or may also comprise an image array 30 as discussed below. In the constructions of FIGS. 1(b) and 1(c), the focussing element array is applied in a gap defined by the first opacifying layer 3a such that the security device 10 is located in a window region 5 as discussed above. However this is not essential and FIG. 1(d) shows an example where the focussing element array 20 is applied to the first surface 2a of the polymer substrate 2 over the first opacifying layer(s) 3a. Preferred methods for manufacturing the focussing element array 20 are discussed below, as well as preferred configurations of the focussing element array 20 itself.

The image array 30, if provided, is preferably located in a plane which substantially corresponds to the focal plane of the focussing elements array 20 (e.g. to within +/−10%, more preferably +/−5%) so that the focussing element array 20 exhibits a substantially focussed image of the image array 30, which is illustrated schematically by the broken-line sun-shaped outline in FIG. 1(a). In practice this focussed image may be optically variable, i.e. have different appearances at different viewing angles, and as such may be referred to more generally as the "optical effect" exhibited by the security device 10. For instance, the image array 30 could co-operate with the focussing element array 20 to form a moiré magnification device, an integral imaging device or a lenticular device, the principles of each having been discussed above, or any combination thereof. Preferred methods of manufacturing the image array 30, as well as examples of its configuration, are discussed below.

The focussing element array 20 and image array 30 can be provided at various different positions provided the necessary spacing between them is achieved. In the FIG. 1(*b*) example, this spacing is provided at least in part by the polymer substrate 2 itself, which here is transparent. The focussing element array 20 is located on the first surface 2*a* of the polymer substrate 2 whilst the image array 30 is located on the second surface 2*b*. It will be appreciated that whilst FIG. 1(*b*) shows the device 10 as being located in a full window, the second opacifying layer(s) 3*b* could continue across all or part of the window region 5 (over the image array 30), forming a half window or a mixture of full and half window portions.

In the FIG. 1(*c*) example, both the focussing element array 20 and the image array 30 are provided on the first surface 2*a* of the polymer substrate 2, which now need not be transparent (although this is still preferred). The optical spacing is provided by means other than the polymer substrate 2. In this case the focussing element array 20 and image array 30 are located in a gap in the first opacifying layer(s) 3*a* which forms a half-window. However, the second opacifying layer(s) 3*b* could also be at least partially omitted across the window region 5 to form a full window or a mixture of full and half window portions.

In the FIG. 1(*d*) example, the focussing element array 20 and image array 30 are again both provided on the first surface 2*a* of the polymer substrate 2, this time over the first opacifying layer 3*a* since as previously indicated no window is formed in this case. Again the optical spacing is achieved by means other than use of the polymer substrate 2. It will be appreciated from the FIG. 1(*d*) example, in which the polymer substrate need not be transparent, that whilst security devices 10 of the sort disclosed herein are particularly well suited to application to documents based on polymer substrates, they are not limited in this regard and can be utilised on any type of security document, e.g. those based on paper substrates, or indeed on any article which requires protection from counterfeiting.

Depending on the type of optical effect desired to be displayed by the security device 10, accurate registration between the focussing element array 20 and the image array 30 may or may not be necessary. However this is highly desirable in certain cases.

The security documents and security devices disclosed herein can be optionally be made machine readable by the introduction of detectable materials in any of the layers or by the introduction of separate machine-readable layers. Detectable materials that react to an external stimulus include but are not limited to fluorescent, phosphorescent, infrared absorbing, thermochromic, photochromic, magnetic, electrochromic, conductive and piezochromic materials. This applies to all embodiments of the invention.

Typically to form the finished security document 1, a number of additional processes will take place, including printing of the graphics layer 8 already mentioned above, as well as application of any further security articles such as security threads, strips, patches, foils or the like which may carry features such as diffractive elements (e.g. holograms or Kinegrams), iridescent material, colour-shifting material etc. One example of such an applied security article is shown in FIG. 1 as strip 9. The so-formed material (generally in the form of a web or a sheet, at this stage, as discussed further below) will then be cut into individual security documents 1. All of these process steps are considered optional in the present disclosure and can be implemented by conventional means.

Turning now to the manufacturing process, FIG. 2 is a flow diagram illustrating, at a high level, the main process steps in an exemplary implementation. It must be emphasised that the order of the steps can be varied significantly. Therefore, FIG. 2 serves merely to introduce the key steps involved in manufacturing a polymer-based security document and should not be considered to limit the order of those steps, except where otherwise indicated. It should further be noted that all steps shown in dashed lines are optional.

Thus in step S101, a polymer substrate 2 is provided, typically in web form.

In step S200, a focussing element array 20 is applied to the polymer substrate on its first surface. This will be described below but for the time being it is sufficient to note that the step S200 could involve actual formation of the focussing element array, either on the polymer substrate or on an intermediate component such as a security thread, strip or patch (indicated as step S200*a*) which is then affixed to the polymer substrate. However this is not essential since the focussing element array could be formed in some separate process, possibly by a different entity, as an article such as a security thread, strip or patch, in which case the present step S200 need only involve affixing the pre-formed focussing element array 20 to the polymer substrate 2. For this reason, in the main part the discussion below describes preferred methods of forming the focussing element array as taking place on a focussing element support layer, which could be the polymer substrate 2 but alternatively could be a carrier layer in such a component.

In step S300, an image array 30 is applied to the polymer substrate as will be described below. However, as in the case of the focussing element array 20, similarly step S300 may or may not involve the actual formation of the image array 30. That is, step S300 may comprise forming the image array 30 either on a surface of the polymer substrate or on an intermediate component such as a security thread, strip or patch (indicated as step S300*a*) which is then affixed to the polymer substrate. Alternatively the image array could be formed in some separate process, possibly by a different entity, as an article such as a security thread, strip or patch, in which case the present step S300 need only involve affixing the pre-formed image array 30 to the polymer substrate 2. For this reason, in the main part we describe preferred methods of forming the image array as taking place on a pattern support layer, which could be the polymer substrate 2 but alternatively could be a carrier layer in such a component.

Indeed, where the focussing element array 20 and the image array 30 are both formed away from the polymer substrate 2 and then applied thereto, the focussing element array 20 and the image array 30 could each be formed as part of one and the same security article (such as a thread, strip or patch) which can then be affixed to the polymer substrate 2 in a single step. Thus the focussing element support layer and the pattern support layer could be provided by a single support layer. It is noted as an aside that security articles equipped with a focussing element array 20 and an image array 30 can be applied to any type of security document, not necessarily one based on a polymer substrate.

In step S400, the at least one opacifying layer(s) are applied to the first and/or second surfaces of the polymer substrate 2. In practice this may optionally take place in several steps, which need not all be performed immediately sequentially, one after the other. For instance, one or more of the opacifying layers could be applied before steps S200 and/or S300.

In step S500, which is optional, the graphics layer 8 is applied to the opacifying layers, typically by way of security printing techniques. For example, the graphics layer 8 may be printed by any conventional printing technique, or combination of techniques, such as intaglio printing, lithographic printing, offset printing, flexographic printing, gravure printing and the like. The graphics layer 8 typically comprises high resolution patterns such as fine line patterns and guilloches, portraits, and other indicia. In step S600, which is also optional, any additional security devices on articles such as threads, strips, patches etc., are applied to the substrate. Any conventional techniques for applying such components can be utilised, including bonding by adhesives, lamination, hot stamping, transfer methods and the like. The security devices could be of any known type, such as holograms, kinegrams and other diffractive elements, iridescent or colour-shift material, etc. Steps S500 and S600 could take place in either order and/or as a series of sub-steps which could be intermingled with one another. Finally, the processed material is cut into individual security documents in step S700.

In the present example, all of the steps described have been web-based processes, i.e. applied to a web of the polymer substrate 2, e.g. in one in-line process. Typically a web with a large width (e.g. between 0.75 and 1.5 m) is supplied for this purpose. However, for some process steps it is desirable to reduce the width of the web, e.g. so that shorter (and hence less costly) processing tools can be used. It is also desirable to carry out certain process steps on individual sheets of the material, rather than on a continuous web. This is particularly the case for security print step S500. Hence, line S800 represents slitting the initial web along its longitudinal direction so as to reduce its width, subsequent processing steps utilising processing tools of correspondingly shorter width compared with those of the preceding steps. Line S900 represents dividing the web into sheets, by cutting it along its cross direction at intervals spaced in the longitudinal direction. This process is sometimes referred to as "sheeting". Each sheet will preferably be sized so as carry a plurality of the final security documents. Subsequent processes are performed using sheet-fed machinery.

It will be appreciated that the points in the process at which steps S800 and S900 are performed can be varied and are indicated only schematically in FIG. 2. Typically at least one process step will be performed on the reduced-width web (i.e. between steps S800 and S900), although this is not depicted here.

To illustrate the production of various key components of the security document 1 by the above steps, FIG. 3 schematically illustrates exemplary apparatus for carrying out steps S200, S300 and S400 on a polymer substrate 2 in the form of a web. It will be noted that the order of steps shown here is different from that in FIG. 2. The polymer substrate 2 is provided from a supply such as a reel 100.

The polymer substrate may undergo various treatment steps (not shown in FIG. 3), such as the application of a primer or corona treatment, before being subjected to the processing described below. The polymer substrate is conveyed along a transport path by a transport module (not shown) of conventional construction. The direction of transit is termed the machine direction (MD) and the orthogonal direction in the plane of the web is the cross direction (CD).

At a focussing element station 200, a focussing element array 20 is applied to the first surface of the substrate. As mentioned above, this may involve actual forming of the focussing element array 20 in-situ on the polymer substrate, e.g. by cast-curing, or could involve supplying a security article 290, shown in the form of a thread or strip, from an ancillary supply 200a and affixing at least portions of it carrying a pre-formed focussing element array to the surface of the polymer substrate, e.g. by lamination, adhesive or hot-stamping. Further details of preferred methods for forming the focussing element array 20 are below. In the example shown, the focussing element array 20 is applied at spaced intervals so as to form one or more devices 10 on each section of the web that will form a separate security document once cut. However in other cases the focussing element array could be applied continuously along the polymer substrate 2.

At an opacifying layer station 400, one or more opacifying layer(s) are applied to the first and/or second surfaces of the polymer substrate 2, as described further below. Since the focussing element array 20 has already been applied to the polymer substrate in this embodiment, the application of the first opacifying layer 3a should omit at least part of the area(s) in which the focussing element array 20 is disposed so that it remains at least partially uncovered. The exception is where the focussing element array comprises mirrors rather than lenses in which case it could be covered on the first surface of the substrate and ultimately viewed from the opposite side. In the example shown, the second opacifying layer 3b is also omitted in the same area, so as to form a full window in which the focussing element array 20 is arranged.

At an image array station 300, an image array 30 is applied to the second surface of the polymer substrate 2. As mentioned above, this may involve actual forming of the image array 30 in-situ on the polymer substrate, e.g. by printing, or could involve supplying a security article 390, shown in the form of a thread or strip, from an ancillary supply 300a and affixing at least portions of it carrying a pre-formed image array to the surface of the polymer substrate, e.g. by lamination, adhesive or hot-stamping. Further details of preferred methods for forming the image array 30 are below. In the example shown, the image array 30 is applied opposite each of the focussing element arrays 20 such that in each window the device 10 exhibits a focussed image of the image array 30.

The web can then go on to be subjected to any of the optional processing steps described previously with respect to FIG. 2, not shown in FIG. 3. As noted above, whilst the apparatus shown in FIG. 3 is depicted as an in-line, web-based process, it is not essential that all of steps S200, S300 and S400 be carried out in such a way.

A focussing element array 20 comprises a plurality of focussing elements, typically lenses or mirrors, arranged over an area typically in a regular one-dimensional or two-dimensional grid. The nature of the focussing elements will depend on the desired optical effect but examples include cylindrical focussing elements, spherical focussing elements, aspherical focussing elements, elliptical focussing elements, Fresnel focussing elements and the like. The focussing elements can operate on refraction, diffraction or reflection (in the case of mirrors). For brevity, in the discussion below the term "lens" is used interchangeably with the term "focussing element" but this should not be taken as limiting.

The focal length of the lenses is directly related to their size (radius) and the available optical spacing must be taken into account when designing the lens array. Generally, the relationship between focal length f and lens radius r is:

$$f \propto \frac{r}{\Delta n}$$

where Δn is the difference in refractive index across the interface defining the lens surface. In an example, for an image array 30 on the second surface of the polymer substrate 2 to be focussed by a focussing element array on the first surface of the polymer substrate 2, the optical geometry must be taken into account when selecting the thickness of the polymer substrate 2 (and any other optical spacer layer that may exist between the focussing element array 20 and the image array 30) and the dimensions of the lenses. In preferred examples the thickness is in the range 50 to 100 microns, hence the focussing element array should have a focal length in the same range. The periodicity and therefore maximum base diameter (or width, in the case of elongate lenses) of the focusing elements is preferably in the range 5 to 200 μm, more preferably 10 to 100 μm and even more preferably 10 to 70 μm. In other examples, the focussing element array 20 and image array 30 may both be arranged on the same side of the polymer substrate in which case the available optical spacing is likely to be smaller (e.g. 5 to 50 microns) and hence the dimensions of the lenses will need to be correspondingly reduced. The f number for the lenticular focusing elements is preferably in the range 0.1 to 16 and more preferably 0.5 to 4.

The focussing element array 20 could include focussing elements with different optical properties from one another, e.g. different focal length, in different sub-regions of the array, by appropriate design of the elements' shape and size. For example, the focussing element array could include lenses of different height from one another giving rise to different focal lengths in each region. In such cases, if a focussed image of an image array 30 is desired the image array 30 may be located at just one of the focal lengths, or two image arrays 30 could be provided, one at each focal length.

The focussing element array 20 can be formed either on the first surface of the polymer substrate 2 or could be on another (transparent) support layer which is then affixed to the first surface of the polymer substrate 2. As defined above, the term "focussing element support layer" is intended to cover both of these options and is therefore used below. In places this is shorted to "support layer" for brevity.

Preferred methods of manufacturing the focussing element array 20 include direct embossing into the surface of the polymer substrate 2, cast-curing, printing and surface-treatment controlled coating methods. Apart from the first of these, each of these techniques can either be performed on the first surface of the polymer substrate 2 or could be performed on another (transparent) support layer which is then affixed to the first surface of the polymer substrate 2. As defined above, the term "focussing element support layer" is intended to cover both of these options and is therefore used below. In places this is shorted to "support layer" for brevity.

In one embodiment, lenses may be printed onto a support layer using techniques such as those discussed in U.S. Pat. No. 7,609,451 or US-A-2011/0116152. A doming resin is applied to the support layer using a printing technique such as flexographic, lithographic or gravure printing in accordance with the desired grid arrangement. The nature of the doming resin and the volume in which it is applied is configured such that, upon application, the material adopts a dome-shaped profile having light-focussing properties. Examples of suitable doming resins are mentioned in the above-cited documents and include UV curable polymer resins such as those based on epoxyacrylates, polyether acrylates, polyester acrylates and urethane acrylates. Examples include Nasdar™ 3527 supplied by Nasdar Company and Rad-Cure™ VM4SP supplied by Rad-Cure Corporation.

In another embodiment, lenses may be formed by controlling the surface energy of the support layer in accordance with the pattern of lenses to be formed, and then applying a suitable material which will reticulate in accordance with the varying surface energy to form the lenses. Examples of how to implement this, and of suitable materials, can be found in US-A-20130071568.

In a further embodiment, a surface relief defining the focussing element array can be embossed into the surface of the polymer substrate 2 from a suitably shaped embossing die, by the application of heat and pressure. This approach has the advantage that no additional layers of material need be applied to the polymer substrate 2, thereby keeping its thickness to a minimum. However, in some cases this is not beneficial since this reduces the available optical spacing and hence requires the formation of smaller lenses and higher resolution of the image array 30.

The most preferred method of forming the focussing element array 20 is by cast-curing. This involves applying a transparent curable material either to the support layer or to a casting tool carrying a surface relief defining the desired focussing element array, forming the material using the casting tool and curing the material to fix the relief structure into the surface of the material.

For reference, FIGS. 4 and 5 schematically depict two cast-curing techniques which can be used to form the focussing element array in embodiment of the present invention. Components common to both methods are labelled with the same reference numbers. In both cases the process is shown as applied to a focussing element support layer 201, comprising a transparent film, which may be the aforementioned polymer substrate 2 or could be another layer which is later applied to the polymer substrate 2. In each case, Figure (a) depicts the apparatus from a side view, and Figure (b) shows the support layer in a perspective view, the manufacturing apparatus itself being removed for clarity. FIG. 5(c) shows a variant of the FIG. 5(a) example.

Figure 6A:
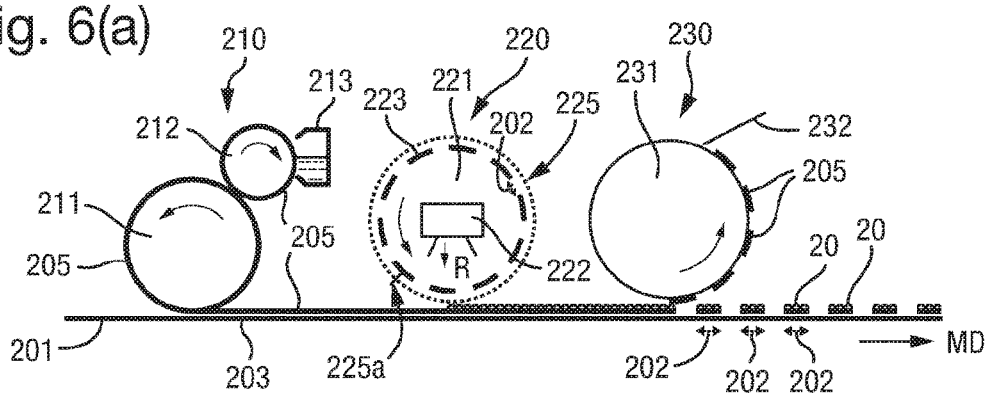
Figure 6B:
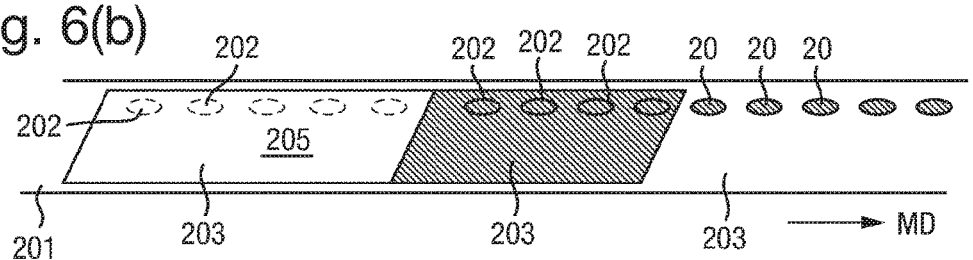
Figure 7A:
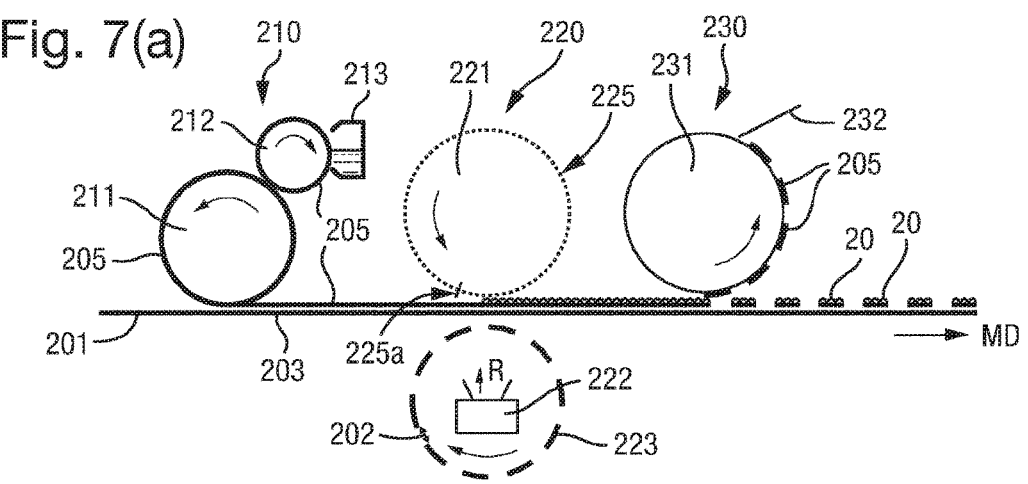
Figure 7B:
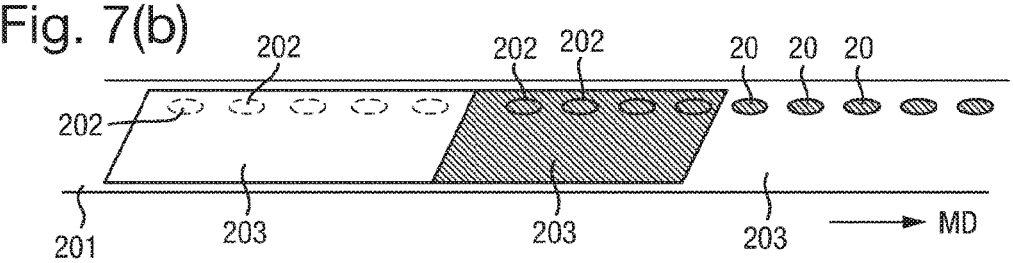

In the FIG. 4 example, a transparent curable material 205 is first applied to the support layer 201 using an application module 210 which here comprises a patterned print cylinder 211 which is supplied with the curable material from a doctor chamber 213 via an intermediate roller 212. For example, the components shown could form part of a gravure printing system. Other printing techniques such as lithographic, flexographic, screen printing or offset printing could also be used. Print processes such as these are preferred since the curable material 205 can then be laid down on the support 201 only in first regions 202 thereof, the size, shape and location of which can be selected by control of the print process, e.g. through appropriate configuration of the pattern on cylinder 211. However, in other cases, an all over coating method could be used, e.g. if the focussing element array is to be formed all over the support 201 or if the method variants described below with respect to FIGS. 6 and 7 are utilised. The curable material 205 is applied to the support 201 in an uncured (or at least not fully cured) state and therefore may be fluid or a formable solid.

The support 201 is then conveyed to a casting module 220 which here comprises a casting tool 221 in the form of a cylinder carrying a surface relief 225 defining the shape of the focussing elements which are to be cast into the curable material 205. As each region 202 of curable material 205 comes into contact with the cylinder 221, the curable material 205 fills a corresponding region of the relief structure, forming the surface of the curable material into the shape defined by the relief. The cylinder 221 could be configured such that the relief structure 225 is only provided at regions corresponding to shape and position of the first regions 202 of curable material 205. However this gives rise to the need for accurate registration between the application module 210 and the casting module 220 in order that the focussing elements are accurately placed in each first region 202 of the curable material. Therefore in a particularly preferred example, the cylinder 221 carries the relief structure corresponding to the focussing elements over an area larger than that of the first region 202, preferably around its complete circumference and most preferably over substantially its whole surface (although axial regions which will not come into the vicinity of the curable material may be excluded). In this way, each entire first region 202 of curable material 205 is guaranteed to come into contact with the surface relief structure 225 such that the focussing element array is formed over the full extent of the material. As a result, the shape, size and location of the focussing element array 20 is determined solely by the application of the curable material by the application module.

Having been formed into the correct surface relief structure, the curable material 205 is cured by exposing it to appropriate curing energy such as radiation R from a source 222. This preferably takes place while the curable material is in contact with the surface relief 225 although if the material is already sufficiently viscous this could be performed after separation. In the example shown, the material is irradiated through the support layer 201 although the source 222 could alternatively be positioned above the support layer 201, e.g. inside cylinder 221 if the cylinder is formed from a suitable transparent material such as quartz.

FIG. 5 shows variants of the above process in which, rather than apply the curable material 205 to the support layer 201, it is applied instead to the surface of the casting cylinder 225. Again this is preferably done in a patterned manner, using a print cylinder 211 to transfer the curable material 205 only onto the first regions 202 on the casting cylinder 221. Upon contact with the support layer 201, the regions 202 of curable material 205 affix to the support layer 205 and curing preferably takes place at this stage to ensure strong bonding. The so-formed focussing element arrays 20 again have a shape, size and location determined solely by the application module 210.

FIG. 5(*c*) illustrates an alternative implementation in which rather than apply the curable material 205 to the support layer 201 or the casting cylinder 221 in a patterned manner to define the first regions 202, the casting cylinder 221' is modified to achieve such patterning. Thus, the surface relief 225 defining the focussing element array is only provided in discrete patches of the surface of the casting cylinder 221' with the intervening areas having no surface relief. The curable material 205 can be applied all over the surface of casting cylinder 221', e.g. from a reservoir as shown or from an applicator roller. The curable material 205 fills at least the relief regions 225 and if any is collected on the intervening surface regions, a removal device such as a doctor blade or squeegee 213' may be provided to clear those areas. The support layer 201 is brought into contact with the cylinder 221', preferably in a wrap configuration as shown, and the curable material 205 is exposed to appropriate curing energy R from a source 222, preferably during contact as shown. The support layer 201 is then separated from the cylinder 221' and now carries discrete patches of focussing element arrays 20 in respective first regions 202.

In all of the above examples, preferably the first regions 202 have the form of indicia, such as an alphanumeric character, a symbol, logo or other item of information to increase the complexity of the design.

The surface relief 225 may be carried by cylinder 221 in the form of a sheet embossed or otherwise provided with the required relief, which is wrapped around the cylinder 221 and clamped in place. This may result in a noticeable join 225*a* where the two ends of the sheet meet, at which there is a discrepancy in the relief pattern. If replicated into one of the focussing element arrays this would cause a reduction in quality. It is therefore preferred that the casting module is at least coarsely registered to the application module so that the location of join 225*a* where it contacts support 201 does not coincide with any of the first regions 202 but rather is located between them, as shown by the example location labelled 225*b*. In cases where the curable material is applied (and retained) all over the support, or at least along a continuous strip in the machine direction MD, this join 225*a* is still preferably positioned outside the first region which is to be used to form the security device, advantageously in a location which will subsequently be coated with one of the opacifying layers 3. To achieve this consistently it is desirable for the process for forming the focussing element array to be registered with the opacifying layer application process, e.g. performed in the same in-line process.

FIGS. 6 and 7 show an alternative cast-cure process for forming the focussing element array according to another example. Again, components corresponding to those described above are labelled with the same reference numerals used previously and will not be described in detail again. In this case, the shape, size and location of each focussing element array is determined not by the initial application of the curable material 205 to the support layer 201 but by selective curing of that material.

Referring first to FIG. 6, here the application module 210 applies the curable material over not only the first regions 202 in which the focussing element array is ultimately to be located, but additionally over a second region 203 such that in this example substantially the whole of the first surface of the support layer 201 is coated with the curable material 205. Thus whilst in the example shown the application module is still constituted by a printing system as described previously (but in which the cylinder 211 defines a print area substantially over the whole area of the support as described here), this could be replace by a non-selective, all over coating module. The curable material 205 is then brought into contact with the casting tool 220 which again in this case is preferably provided with the appropriate surface relief 225 over substantially the whole of its circumference. Thus, the whole of the first and second regions 202, 203 of the curable material are formed in accordance with the relief structure. However, only selected portions of the material are cured. This can be achieved by providing a mask 223 through which the curable material 205 is exposed to the curing energy, e.g. UV radiation. The mask 223 defines radiation-transparent portions corresponding to the first regions 202 and radiation-opaque portions in between such that the second region 203 of the curable material is not cured. In this example, the radiation source 222 is located inside the casting cylinder 221 and the mask 223 is also arranged on the inside of that cylinder.

A removal module 230 is additionally provided to remove the uncured material 205 from the second region 203, leaving only the cured material in the first regions 202, bearing the desired surface relief and thereby forming the focussing element arrays 20. The removal module 230 can comprise a cleaning roller 231 with a (preferably soft) surface to which the uncured material 205 will adhere and be lifted off the support 201. A cleaning system such as a doctor blade or squeegee 232 may be provided to remove the waste material 205 from the roller 231.

In a variant of the FIG. 6 example, the patterned mask 223 and curing energy source 222 may be arranged on the other side of the transport path, as shown in FIG. 7. Here the support layer 201 is conveyed through a nip defined between the casting cylinder 221 and a mask cylinder 223 arranged to move at substantially the same speed as one another. In other respects the FIG. 7 apparatus is the same as that of FIG. 6.

In both variants, any join 225a in the surface relief on the casting cylinder is preferably aligned with one of the opaque portions of the mask 223 such that the area of material 205 into which that part of the surface relief is formed will not be cured and is removed by station 230.

In both variants, the curable material 205 could be applied to the surface of the casting cylinder 221 instead of onto the support later 201, e.g. using an arrangement corresponding to that shown in FIG. 5.

The curable material 205 is preferably radiation-curable and may comprise a resin which may typically be of one of two types, namely:
a) Free radical cure resins, which are typically unsaturated resins or monomers, pre-polymers, oligomers etc. containing vinyl or acrylate unsaturation for example and which cross-link through use of a photo initiator activated by the radiation source employed e.g. UV.
b) Cationic cure resins, in which ring opening (e.g. epoxy types) is effected using photo initiators or catalysts which generate ionic entities under the radiation source employed e.g. UV. The ring opening is followed by intermolecular cross-linking.

The radiation used to effect curing will typically be UV radiation but could comprise electron beam, visible, or even infra-red or higher wavelength radiation, depending upon the material, its absorbance and the process used. Examples of suitable curable materials include UV curable acrylic based clear embossing lacquers, or those based on other compounds such as nitro-cellulose. A suitable UV curable lacquer is the product UVF-203 from Kingfisher Ink Limited or photopolymer NOA61 available from Norland Products. Inc, New Jersey.

The curable material 205 could itself also be elastomeric and therefore of increased flexibility. An example of a suitable elastomeric curable material is aliphatic urethane acrylate (with suitable cross-linking additive such as polyaziridine). Alternatively, any of the materials identified above as suitable for forming a flexible pedestal layer 249 could be used as the curable material 205.

As noted above, the image array 30 can be provided in various different ways. It is particularly advantageous to provide an image array configured to co-operate with the focussing element array 20 to produce an optically variable effect. For example, the image array 30 and focussing element array 20 may, in combination, form a moiré magnification device, an integral imaging device or a lenticular device, the mechanism on which each operates having been discussed above.

Security devices of the above types depend for their optical effect at least in part upon the high resolution with which the image array 30 has been produced. For instance, in a lenticular device, each image element or "slice" making up image array 30 must be narrower than the pitch of the focussing element array 20, which as discussed above is typically no more than 100 microns, usually less. For example, if the diameter of the focusing elements is 30 μm then each image element may be around 15 μm wide or less. Alternatively for a smooth lenticular animation effect it is preferable to have as many different interleaved images as possible, typically at least five but ideally as many as thirty. In this case the size of the image elements should be in the range 0.1 to 6 μm. In practice, in a lenticular device, the width of the image elements is directly influenced by two factors, namely the pitch of the focusing element (e.g. lens) array and the number of image elements required within each lens pitch or lens base width. The former however is also indirectly determined by the thickness of the lenticular device. This is because the focal length for a plano-convex lens array (assuming the convex part of the lens is bounded by air and not a varnish) is approximated by the expression $r/(n-1)$, where r is the radius of curvature and n the refractive index of the lens resin. Since the latter has a value typically between 1.45 and 1.5 then we may say the lens focal approximates to 2r. Now for a close packed lens array, the base diameter of the lens is only slightly smaller than the lens pitch, and since the maximum value the base diameter can have is 2r, it then follows that the maximum value for the lens pitch is close to the value 2r which closely approximates to the lens focal length and therefore the device thickness.

To give an example, for a security thread component as may be incorporated into a banknote, the thickness of the lenticular structure and therefore the lens focal length is desirably less than 35 μm. Let us suppose we target a thickness and hence a focal length of 30 μm. The maximum base diameter we can have is from the previous discussion equal to 2r which closely approximates to the lens focal length of 30 μm. In this scenario the f-number, which equals (focal length/lens base diameter), is very close to 1. The lens pitch can be chosen to have a value only a few μm greater than the lens diameter—let us choose a value of 32 μm for the lens pitch. It therefore follows for a two channel one-dimensional lenticular device (i.e. two image element strips per lens) we need to fit two image strips into 32 μm and therefore each strip is 16 μm wide. Similarly for a four channel one-dimensional lenticular the printed line width requirement drops down to 8 μm (in this example).

As a result, the f-number of the lens should preferably be minimised, in order to maximise the lens base diameter for a given structure thickness. For example suppose we choose a higher f-number of 3, consequently the lens base diameter will be 30/3 or 10 μm. Such a lens will be at the boundary of diffractive and refractive physics—however, even if we still consider it to be primarily a diffractive device then the we may assume a lens pitch of say 12 μm. Consider once again the case of a two channel device, now we will need to print an image strip of only 6 μm and for a four channel device a strip width of only 3 μm.

Similar considerations apply to other types of devices. For example, in moiré magnifiers and integral imaging devices, each microimage must be of the same order of magnitude as one lens, or smaller. Thus, the microimage will typically have overall dimensions of 50 microns or less. In order to provide the microimage with any detail, small line widths are required, e.g. of 15 microns or preferably less, ideally 5 microns or less.

Conventional printing techniques will generally not be adequate to achieve such high resolution. For instance, typical printing processes used to manufacture pattern elements (image arrays) for security devices include intaglio, gravure, wet lithographic printing and dry lithographic printing. The achievable resolution is limited by several factors, including the viscosity, wettability and chemistry of the ink, as well as the surface energy, unevenness and wicking ability of the substrate, all of which lead to ink spreading. With careful design and implementation, such techniques can be used to print pattern elements with a line width of between 25 µm and 50 µm. For example, with gravure or wet lithographic printing it is possible to achieve line widths down to about 15 µm. However, consistent results at this resolution are difficult to achieve and in any case this level of resolution still imposes a significant limitation on the security device. Thus while any of the above-mentioned techniques can be employed in embodiments of the present invention, higher resolution methods (i.e. suitable for achieving smaller line widths) for forming the image array 30 would be highly desirable.

One method which has been put forward as an alternative to the printing techniques mentioned above, and can be employed in embodiments of the invention, is used in the so-called Unison Motion™ product by Nanoventions Holdings LLC, as mentioned for example in WO-A-2005052650. This involves creating pattern elements ("icon elements") as recesses in a substrate surface before spreading ink over the surface and then scraping off excess ink with a doctor blade. The resulting inked recesses can be produced with line widths of the order of 2 µm to 3 µm.

A different method of producing high-resolution image elements is disclosed in WO-A-2015/044671 and is based on flexographic printing techniques. A curable material is placed on raised portions of a die form only, and brought into contact with a support layer preferably over an extended distance. The material is cured either whilst the die form and support layer remain in contact and/or after separation. This process has been found to be capable of achieving high resolution and is therefore advantageous for use in forming the image array 30 in the present application.

Some more particularly preferred methods for generating patterns or micropatterns (i.e. an image array 30) on a substrate are known from US 2009/0297805 A1 and WO 2011/102800 A1. These disclose methods of forming micropatterns in which a die form or matrix is provided whose surface comprises a plurality of recesses. The recesses are filled with a curable material, a treated substrate layer is made to cover the recesses of the matrix, the material is cured to fix it to the treated surface of the substrate layer, and the material is removed from the recesses by separating the substrate layer from the matrix.

Another strongly preferred method of forming a micropattern is disclosed in WO 2014/070079 A1. Here it is taught that a matrix is provided whose surface comprises a plurality of recesses, the recesses are filled with a curable material, and a curable pickup layer is made to cover the recesses of the matrix. The curable pickup layer and the curable material are cured, fixing them together, and the pickup later is separated from the matrix, removing the material from the recesses. The pickup layer is, at some point during or after this process, transferred onto a substrate layer so that the pattern is provided on the substrate layer.

The above-mentioned methods described in US 2009/0297805 A1, WO 2011/102800 and WO 2014/070079 A1 have been found to produce particularly good results and are therefore particularly preferred for use in forming the image array 30 in embodiments of the invention.

In other examples the image array 30 can be formed by a relief structure and a variety of different relief structure suitable for this are shown in FIG. 8. Thus, FIG. 8a illustrates image regions of the image elements (IM), in the form of embossed or recessed regions while the non-embossed portions correspond to the non-imaged regions of the elements (NI). FIG. 8b illustrates image regions of the elements in the form of debossed lines or bumps.

In another approach, the relief structures can be in the form of diffraction gratings (FIG. 8c) or moth eye/fine pitch gratings (FIG. 8d). Where the image elements are formed by diffraction gratings, then different image portions of an image (within one image element or in different elements) can be formed by gratings with different characteristics. The difference may be in the pitch of the grating or rotation. This can be used to achieve a multi-colour diffractive image which will also exhibit a lenticular optical effect such as an animation through the mechanism described above. For example, if the image elements had been created by writing different diffraction tracks for each element, then as the device is tilted, lenticular transition from one image to another will occur as described above, during which the colour of the images will progressively change due to the different diffraction gratings. A preferred method for writing such a grating would be to use electron beam writing techniques or dot matrix techniques. Using a diffractive structure to provide the image elements provides a major resolution advantage: although ink-based printing is generally preferred for reflective contrast and light source invariance, techniques such as modern e-beam lithography can be used generate to originate diffractive image strips down to widths of 1 µm or less and such ultra-high resolution structures can be efficiently replicated using UV cast cure techniques.

Such diffraction gratings for moth eye/fine pitch gratings can also be located on recesses or bumps such as those of FIGS. 8a and b, as shown in FIGS. 8e and f respectively.

FIG. 8g illustrates the use of a simple scattering structure providing an achromatic effect.

Further, in some cases the recesses of FIG. 8a could be provided with an ink or the debossed regions or bumps in FIG. 8b could be provided with an ink. The latter is shown in FIG. 8h where ink layers 200 are provided on bumps 210. Thus the image areas of each image element could be created by forming appropriate raised regions or bumps in a resin layer provided on a transparent substrate. This could be achieved for example by cast curing or embossing. A coloured ink is then transferred onto the raised regions typically using a lithographic, flexographic or gravure process. In some examples, some image elements could be printed with one colour and other image elements could be printed with a second colour. In this manner when the device is tilted to create the lenticular animation effect described above, the images will also be seen to change colour as the observer moves from one view to another. In another example all of the image elements in one region of the device could be provided in one colour and then all in a different colour in another region of the device.

Finally, FIG. 8i illustrates the use of an Aztec structure.

Additionally, image and non-image areas could be defined by combination of different element types, e.g. the image areas could be formed from moth eye structures whilst the non-image areas could be formed from gratings. Alternatively, the image and non-image areas could even be formed by gratings of different pitch or orientation.

Where the image elements are formed solely of grating or moth-eye type structures, the relief depth will typically be in the range 0.05 microns to 0.5 microns. For structures such as those shown in FIGS. 8 *a, b, e, f, h* and *i*, the height or depth of the bumps/recesses is preferably in the range 0.5 to 10 μm and more preferably in the range of 1 to 2 μm. The typical width of the bumps or recesses will be defined by the nature of the artwork but will typically be less than 100 μm, more preferably less than 50 μm and even more preferably less than 25 μm. The size of the image elements and therefore the size of the bumps or recesses will be dependent on factors including the type of optical effect required, the size of the focusing elements and the desired device thickness.

For some types of security device, accurate registration of the focussing element array 20 and the image array 30 is not required, provided the two items are at least coarsely registered to one another such that they overlap in the desired device region. This is particularly the case for moiré magnification devices in which a magnified version of the microimage array will be generated even if the two arrays are misaligned, although the translational position and/or the orientation and size of the magnified images may vary.

However, if registration can be achieved between the focussing element array 20 and the image array 30, this enables a level control over the optical effect generated by the device which is extremely difficult to imitate by any other means and thereby presents a substantial challenge to counterfeiters. For example, in a moiré magnification device, accurate registration enables the precise location, size and orientation of the magnified images to be maintained constant for every device manufactured such that a user checking the authenticity of the device will be able to compare the location of the magnified image to some reference point on the security document (such as the centre of the device 10) and if this is incorrect, reject the device as fraudulent.

Registration has even more profound effects on lenticular type devices, in which the range of viewing angles over which each of the interleaved images will be displayed depends on the positioning of the respective image elements underneath each lens. It is important to achieve good skew registration so that the orientation of the two arrays are aligned. If not, parts of individual image elements will extend from the footprint of the lens through which they are intended to be viewed into another, with the result that the desired images may not be displayed properly, or only across part of the security device. In addition, without accurate translational registration (in the machine direction and/or the cross direction) of the focussing element array 20 to the image array 30, it is not possible to control the location of the image elements relative to the lenses meaning that the order in which they will be displayed as the device is tilted cannot be controlled. For instance, an image which is intended to be displayed when the device is viewed along the normal may in practice be displayed only at some off-axis angle, and images which are intended to show different extremes of an animation (e.g. an object at its largest size and at its smallest) may be displayed at adjacent viewing angle ranges meaning that upon tilting the animation appears to skip frames, jumping from one to another without a smooth continuum therebetween. Various approaches for avoiding this problem have been proposed, including the use of cyclic effects as described in GB-A-2490780, in which the images are configured such that the same cyclic animation will be displayed no matter which image is located at the centre viewing position. However, the lack of registration limits the type of optical effect which can be implemented successfully. In particular, sets of images showing the same object from different view points so as to create a 3D effect upon tilting would benefit greatly from accurate registration.

The registration between the focussing element array 20 and image array 30 can be improved in accordance with embodiments of the present invention by employing a feedback system, an example of which is depicted in FIG. 9. In the example shown, the processing steps are carried out in a different order to that previously described. However as mentioned above, the various steps can be performed in many different orders and so FIG. 9 illustrates a further option. Nonetheless, the described feedback system can be applied to any process line irrespective of the order of steps.

FIG. 9(*a*) shows the manufacturing apparatus in a side view, and (b) shows a perspective view of the polymer substrate 2 with the manufacturing tools removed to aid clarity.

In the example shown, the polymer substrate 2 is first coated with opacifying layers 3*a*, 3*b* on its first and second surfaces by opacifying module 400, here comprising a gravure print cylinder 401, 402 on each side of the substrate 2. The opacifying layers are applied so as to form window regions 5 in which the opacifying layers are omitted. Next, the image array 30 is formed at an image array module 300 which can take any of the forms discussed above. Only an exemplary die form 302 is depicted, for clarity. The image array in this example is applied to the first surface of the polymer substrate 2 and its form will be described further below. In the next step, the focussing element array 20 is formed in focussing element array module 200 and in this example this also takes place on the first surface of the substrate 2, although in other cases it may be applied to the opposite side. To provide the necessary focal length, an optical spacer may be built into the lens design. The focussing element array 20 can be formed using any of the methods described above, only an exemplary casting tool 221 being shown here for clarity.

As shown best in FIG. 9(*b*), the image array 30 is preferably formed in at least a first registration zone 550 of the substrate 2 as well as in the regions where the security device is to be formed, termed the device zone 560, which here are located in window regions 5. In practice, the first registration zone and device zone could be one and the same in certain cases as mentioned below. The image array may optionally also be provided in a coarse registration mark 590. Preferably the first registration zone 550 and any coarse registration mark 590 are located in regions of the substrate 2 which will fall outside the areas of the finished security documents and will therefore be cut off and disposed of in a later manufacturing step. The various zones of the image array 30 will automatically be in register with one another since they are formed from a single print tool 300.

Similarly, the focussing element array 20 is preferably formed at least in the first registration zone 550, the device zone 560 and optionally as another coarse registration mark 595 (which may or may not overlap mark 590). Again, since all of these portions of focussing element array 20 are formed from the same tool, they are automatically in register with one another.

In at least the registration zone and preferably the device zone, the image array 30 and the focussing element array 20 are configured to co-operate with one another to generate one or more optically variable effects as detailed further below.

The substrate 2 is then conveyed through an optical capture module 500 which includes one or more optical detectors 505, 510 such as cameras or video cameras. The optical detector(s) are configured to capture an image of the registration zone 550 at two different angles (the field of view of the cameras being indicated as F in FIG. 9(*b*)). Thus, in the present example the optical capture module 500 includes a first camera 505 arranged to view the zone 550 from a normal angle (perpendicular to the plane of the substrate) and a second camera 510 arranged to view the same portion of the zone 550 from a different angle. This arrangement is preferred since the two cameras can provide a continuous feed of the appearance of the zone at both viewing angles as the substrate is conveyed therethrough. However as an alternative a single camera 505 could be provided and suitable means arranged for moving either it or the substrate so that the relative angle between them can be changed back and forth between the two viewing positions.

The two captured views are passed to an image processor 520 which analyses the views as described further below. Based on the output, a determination is made as to whether the image array 30 and focussing element array 20 are correctly registered and, if not, controller 530 generates and outputs one or more feedback signals to control one or more of the steps involved in applying the image array 30 and/or focussing element array 20. For example, this could involve adjusting any of the following parameters:

the relative position of the focussing element cylinder 221 and the image cylinder 302 in the machine direction and/or in the cross direction orthogonal to the machine direction;

the speed of rotation of the focussing element cylinder 221 and/or the image cylinder 302;

the temperature of the focussing element cylinder 221; or the tension at which the transparent support layer 2 is held in module 200 and/or 300.

The pitch of one array relative to the other can be adjusted by varying the web tension and/or the casting tool temperature. Translational errors between the arrays can be adjusted by moving the die form 302 relative to the casting tool 221 in the machine direction and/or cross direction, e.g. using a piezoelectric transducer, and/or by adjusting the speed of the die form 302 relative to that of the casting tool 221. More information about how these and other parameters affect the registration and how they might be adjusted is described in WO2009085004.

In order to accurately determine the level of registration, in the first registration zone 550 the image array 30 and focussing element array 20 are each configured to give rise to a lenticular effect. Most preferably, in combination the two arrays form a one-dimensional, two channel lenticular device (although more than two channels could be used). An example of such a device is shown in FIG. 10 in perspective view (a) from a first viewing angle as seen by camera 505 and (b) from a second viewing angle as seen by camera 510. The focussing element array 20 comprises a regular array of cylindrical lenses and the image array 30 comprises an array of elongate image strips A corresponding to a first image, interlaced with elongate image strips B corresponding to a second image. The periodicity and orientation of the image strips and lenses is designed to be substantially the same, such that the device operates as will now be described. However it will be appreciated that in practice misregistration may exist, which the present system is designed to reduce.

Figure 11B:
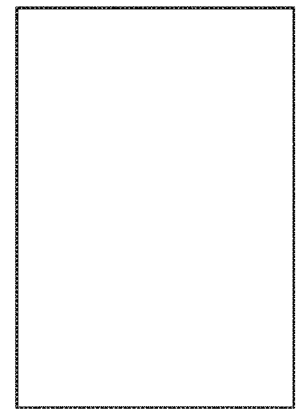

Thus, from a first viewing angle as shown in FIG. 10(*a*) each lens of array 20 should direct light from an underlying image strip A to the camera 505, with the result that the camera receives a complete view of image A. In the example depicted, image A is an all-over block of a uniform colour, e.g. black, which is preferred but not essential. The complete image A is shown in FIG. 11(*a*). The device is designed so that image A should be seen across a first range of viewing angles $\Delta\theta 1$, which may be centred on the normal. From a second viewing angle outside $\Delta\theta 1$, as shown in FIG. 10(*b*), each lens of array 20 should direct light from an underlying strip of image B to the camera 510, such that a complete view of image B is captured. In this example, image B is an all-over block of a different uniform colour, e.g. white, which again is preferred but not essential. The device is designed so that image B should be displayed across a second range of viewing angles $\Delta 74\ 02$.

The optical capture module 500 is arranged so as to capture a view of the device from a first test viewing angle within the range $\Delta\theta 1$ and from a second test viewing angle within the range $\Delta\theta 2$. Therefore, if the device is correctly registered, the first captured view (e.g. by camera 505) should be a complete view of the first image, and the second captured view (e.g. by camera 510) should be a complete view of the second image. If there is misregistration, both cameras may receive a view of the same image (i.e. image A or image B), or one or both cameras may see some intermediate or incomplete image.

Image processor 520 determines whether the captured images are as expected. This can be done by comparing the two captured images against one another and/or against stored information as to the expected images. For instance where the two images are all over block colours as in this example, by comparing the two darkness levels against one another the processor can determine whether the registration is correct by checking that the difference is greater than a predefined threshold. In other cases, image recognition software may be used to compare each captured image against stored versions of the expected images.

The lenticular device could contain a greater number of different images which would increase the accuracy with which the optical capture module 500 can determine the registration, since each viewing angle range $\Delta\theta 1$, $\Delta\theta 2$ etc. will be correspondingly smaller and so smaller degrees of misalignment will cause the images to be displayed outside the expected angular ranges. In this case still only two images need to be captured, but a greater number of images at different angles could be captured and compared if desired.

Based on the outcome of the comparison, it is determined whether misregistration exists and if so a feedback signal is output by controller 530 to either or both of modules 300 and 200 to adjust any necessary processing parameters such as those mentioned above. As such, the relative positions at which the image array 30 and focussing element array 20 are arranged on subsequent portions of the web 2 will be changed and brought into closer register. Feedback adjustment continues until the output from optical capture module 500 indicates that the desired relative positioning has been achieved.

It will be appreciated that the nature of the image array 30 and focussing element array 20 in the device zone 560 need not be the same as that in the first registration zone 550 used in the above feedback control method. Thus, there is no limitation on the nature of the optical effect that can be manufactured on the security document 1 itself. Of course, if the desired optical effect for use on the finished document 1 is a suitable lenticular effect, the device zone itself could be used as the registration zone, with no separate area being required for this purpose.

Optionally, a second registration zone 555 may additionally be formed on the substrate 2. In the second registration zone, a moiré interference device is formed by the image array 30 and focussing element array 20 in combination, which can be used to identify mis-orientation between the two arrays (i.e. skew) and/or incorrect pitches of either array. FIG. 12 illustrates an exemplary device where the image array 30 in the second registration zone comprises a regular array of markings 31, here a regular straight line grid, and the focussing element array 20 similarly comprises a regular array of lenses, here straight cylindrical lenses. FIG. 13(a) illustrates the lens array pattern, and FIG. 13(b) the image array pattern. The two are configured such that if there is zero skew between them and their pitches match, when the two are overlapped there will be no moiré interference. However, as shown in FIG. 13, if there is a mismatch in either pitch or orientation (only a skew offset is shown here for clarity) then a moiré interference pattern will be exhibited by the two arrays in combination. An example of such a moiré interference pattern is shown in FIG. 13(c). The appearance of the second registration zone is optically captured, optionally using the same camera system 505 as already described above and it is determined whether a moiré interference pattern exists, e.g. using pattern recognition software. Depending on the outcome, a feedback signal is generated and conveyed back to the appropriate manufacturing module(s) in a similar manner to that described above to improve the skew and/or pitch mismatch.

Preferably, if such an optional second registration zone 555 is provided, these steps of using feedback to adjust the orientation and/or pitch are performed prior to the registration adjustment already described above.

The optional registration marks 590, 595 can be used for coarse registration of the image array 30 and focussing element array 20 in a conventional manner, e.g. by detecting the perimeter of each mark and checking the spacing between them is correct. The detection could be carried out by the optical capture module 500 if its field of view encompasses area C or by a separate system.

The feedback system could optionally also be used to adjust other steps in the document manufacture process, such as the application of opacifying layers 3 at module 400.

The feedback system has been described with reference to use on a substrate 2 ultimately forming the basis of a polymer security document but in other cases the same principle could be applied to the production of threads, strips and other security devices in which the web would be formed of another support layer, such as support layers 201, 301 mentioned in previous sections. The application of opacifying layers would generally be omitted in this case.

The invention claimed is:

1. A method of manufacturing a security device, the method comprising:
   providing a support layer having a first surface and a second surface;
   conveying the support layer along a transport path in a machine direction, and during the conveying:
   (a) forming an array of focussing elements on the first surface of the support layer in at least a first region; and
   (b) applying an image array to the first surface or the second surface of the support layer in at least part of the first region,
   wherein, if the image array is applied to the first surface of the support layer, step (b) is performed before step (a), and if the image array is applied to the second surface of the support layer, steps (a) and (b) are performed in either order or simultaneously and the support layer is a transparent support layer;
   wherein at least in a first registration zone of the support layer:
   the image array includes a set of first image elements including portions of a first image, interleaved with a set of second image elements including portions of a second image, and the array of focussing elements is arranged such that each focussing element of the array of focusing elements directs light from a respective one of the first image elements or from a respective one of the second image elements therebetween in dependence on a viewing angle, whereby, depending on the viewing angle, the array of focussing elements directs light from either the set of first image elements or from the second image elements therebetween, such that as the security device is tilted, the first image is displayed to a viewer of the security device at a first range of viewing angles and the second image is displayed to the viewer of the security device at a second, different range of viewing angles, and then:
   (x) optically capturing, by at least one optical detector, images displayed by the security device from each of at least a first test viewing angle and a second test viewing angle, the first test viewing angle and the second test viewing angle being different from one another, the first test viewing angle being located in an expected first range of viewing angles and the second test viewing angle being located in an expected second range of viewing angles;
   (y) comparing the captured images to each other, or against stored information corresponding to the first and second images, respectively, and making a determination as to whether the first and second images are displayed over the expected first and second ranges of viewing angles; and
   (z) based on the determination, providing feedback control to thereby adjust one or more parameters of step (a) and/or step (b) when performed on subsequent parts of the support layer,
   whereby, on the subsequent parts of the support layer, the array of focussing elements and the image array are more accurately registered to one another in at least one direction.

2. The method according to claim 1, wherein, in step (z), any one or more of the following parameters of step (a) and/or step (b) are controlled based on the determination:
   a relative position of an apparatus that performs steps (a) and (b) in the machine direction or in a cross direction orthogonal to the machine direction;
   a speed at which the support layer is conveyed during step (a) and/or step (b);
   a temperature at which step (a) is performed; and
   a tension at which the support layer is held during step (a) and/or step (b).

3. The method according to claim 1, wherein:
   in step (a), a focussing element cylinder carrying a surface relief on a circumference of the focussing element cylinder corresponding to the array of focussing elements is used to form the array of focussing elements on the first surface of the support layer, and in step (b), an image cylinder applies the image array to the second surface of the support layer, and
   optionally steps (a) and (b) are performed simultaneously at a nip formed between the focussing element cylinder and the image cylinder, the support layer passing through the nip.

4. The method according to claim 3, wherein, in step (z), any one or more of the following parameters of step (a) and/or step (b) are controlled based on the determination:

a relative position of the focussing element cylinder and the image cylinder in the machine direction or in a cross direction orthogonal to the machine direction;

a speed of rotation of the focussing element cylinder or the image cylinder;

a temperature of the focussing element cylinder; or a tension at which the support layer is held during step (a) and/or step (b).

5. The method according to claim 1, wherein the at least one optical detector of step (x) includes at least a first optical detector and a second optical detector configured to view a same area of the support layer at the first and second test viewing angles respectively.

6. The method according to claim 1, wherein step (x) is performed using a first optical detector of the at least one optical detector and an apparatus configured to change a relative position of the first optical detector and an area of the support layer, the first optical detector being used to view a same area of the support layer at the first and second test viewing angles sequentially.

7. The method according to claim 1, wherein step (y) is performed by an image comparison module executed by a processor.

8. The method according to claim 1, wherein step (z) is performed by a controller.

9. The method according to claim 1, wherein, in a device zone of the support layer, the array of focussing elements or the image array has a different configuration from a configuration in the first registration zone.

10. The method according to claim 1, wherein:

in a second registration zone of the support layer, which is laterally offset from the first registration zone:

the image array includes a regular array of markings, and the array of focussing elements includes a corresponding regular array of focussing elements, whereby a mismatch in pitch and/or orientation between the regular array of markings and the regular array of focussing elements results in a moiré interference pattern, and the method further comprises:

(u) optically capturing, by the at least one optical detector, an image of an appearance of the second registration zone;

(v) determining whether the moiré interference pattern exists in the captured image; and (w) based on the determination in step (v), providing feedback control to adjust one or more parameters of step (a) and/or step (b) when performed on the subsequent parts of the support layer, whereby on the subsequent parts of the support layer, the array of focussing elements and the relative pitch or the relative orientation of the image array and the focussing element array are controlled towards desired values.

11. An apparatus for manufacturing a security device, the apparatus comprising:

a transporter configured to convey a support layer having a first surface and a second surface along a transport path in a machine direction, and along the transport path:

(a) a focussing element array application station configured to form an array of focussing elements on the first surface of the support layer in at least a first region; and (b) an image array application station configured to apply an image array to the first surface or the second surface of the support layer in at least part of the first region, wherein, if the image array is applied to the first surface of the support layer, the focussing element array application station is downstream of the image array application station, and if the image array is applied to the second surface of the support layer, the focussing element array application station and the image array application station are in either order along the transport path or at the same location and the support layer is a transparent support layer, and downstream of (a) and (b):

(x) at least one optical detector configured to optically capture images displayed by the security device from each of at least a first test viewing angle and a second test viewing angle, the first test viewing angle and the second test viewing angle being different from one another, the first test viewing angle being located in an expected first range of viewing angles and the second test viewing angle being located in an expected second range of viewing angles;

(y) a processor configured to compare the captured images to each other, or against stored information corresponding to the first and second images, respectively, and making a determination as to whether the first and second images are displayed over the expected first and second ranges of viewing angles; and (z) based on the determination, providing feedback control to adjust one or more parameters of the focussing element array application station and/or the image array application station for processing of subsequent parts of the support layer, whereby, on the subsequent parts of the support layer, the array of focussing elements and the image array are more accurately registered to one another in at least one direction.

12. The apparatus according to claim 11, wherein the at least one optical detector includes at least a first optical detector and a second optical detector configured to view a same area of the support layer at the first and second test viewing angles respectively.

13. The apparatus according to claim 11, wherein the at least one optical detector includes a first optical detector, and the apparatus includes an apparatus configured to change a relative position of the first optical detector and an area of the support layer, the first optical detector being configured to view a same area of the support layer at the first and second test viewing angles sequentially.

\* \* \* \* \*